United States Patent [19]

Ogura et al.

[11] Patent Number: 5,598,274

[45] Date of Patent: Jan. 28, 1997

[54] IMAGE SIGNAL RECORDING AND REPRODUCING SYSTEM

[75] Inventors: Tokihiko Ogura; Ryo Fujimoto, both of Kanagawa-ken, Japan

[73] Assignee: Canon Kabushiki Kaisha, Tokyo, Japan

[21] Appl. No.: 308,627

[22] Filed: Sep. 19, 1994

Related U.S. Application Data

[63] Continuation of Ser. No. 50,757, Apr. 20, 1993, abandoned, which is a continuation of Ser. No. 610,092, Nov. 6, 1990, abandoned.

[30] Foreign Application Priority Data

Nov. 10, 1989 [JP] Japan ...................................... 1-291292
Nov. 10, 1989 [JP] Japan ...................................... 1-293603
Nov. 10, 1989 [JP] Japan ...................................... 1-293604
Nov. 10, 1989 [JP] Japan ...................................... 1-293606
Nov. 10, 1989 [JP] Japan ...................................... 1-293607

[51] Int. Cl.⁶ ............................ H04N 5/76; H04N 5/911
[52] U.S. Cl. ................................... 386/13; 386/16
[58] Field of Search ................................ 358/335, 323, 358/320, 337, 327, 310, 330; 360/27, 33.1; H04N 5/76, 5/911

[56] References Cited

U.S. PATENT DOCUMENTS

| | | | |
|---|---|---|---|
| 3,609,223 | 9/1971 | Tajiri | 358/323 |
| 4,630,131 | 12/1986 | Ichinoi et al. | 358/323 |
| 4,672,470 | 6/1987 | Morimoto et al. | 358/323 |
| 4,792,466 | 12/1988 | Andoh | 358/342 |
| 4,825,299 | 4/1989 | Okada et al. | 358/323 |
| 4,954,911 | 9/1990 | Hirasawa | 358/323 |
| 5,062,005 | 10/1991 | Kitaura et al. | 358/323 |

*Primary Examiner*—Tommy P. Chin
*Assistant Examiner*—Huy Nguyen
*Attorney, Agent, or Firm*—Robin, Blecker, Daley & Driscoll

[57] ABSTRACT

An image signal recording and reproducing system is arranged to record an image signal on a recording medium and to reproduce a recorded image signal from the recording medium. The system adds a pilot signal having a single frequency to at least one of the horizontal and vertical blanking portions of an image signal, and records the thus-added image signal on the recording medium. Accordingly, it is possible to eliminate time base variations which may occur during recording or reproduction without influencing the image signal.

14 Claims, 13 Drawing Sheets

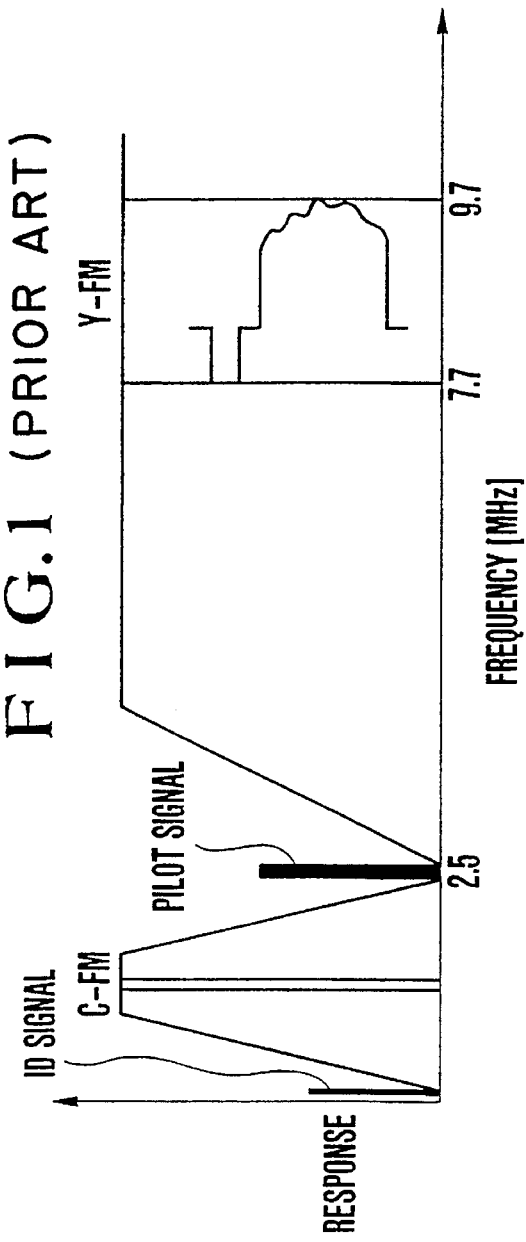
FIG. 1 (PRIOR ART)
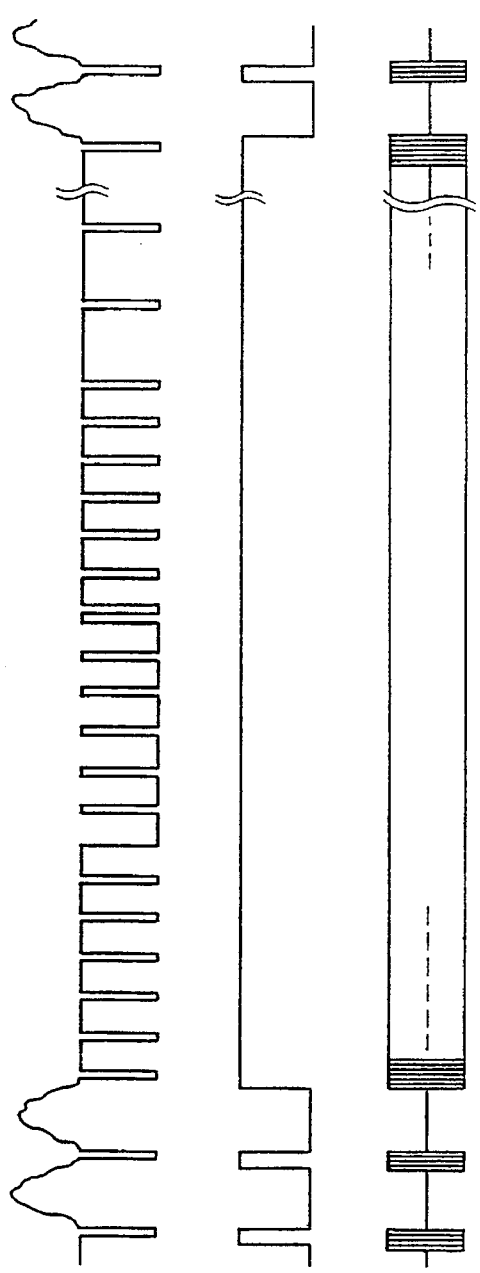
FIG.3(a) Y+S
FIG.3(b) C-BLK
FIG.3(c) fp

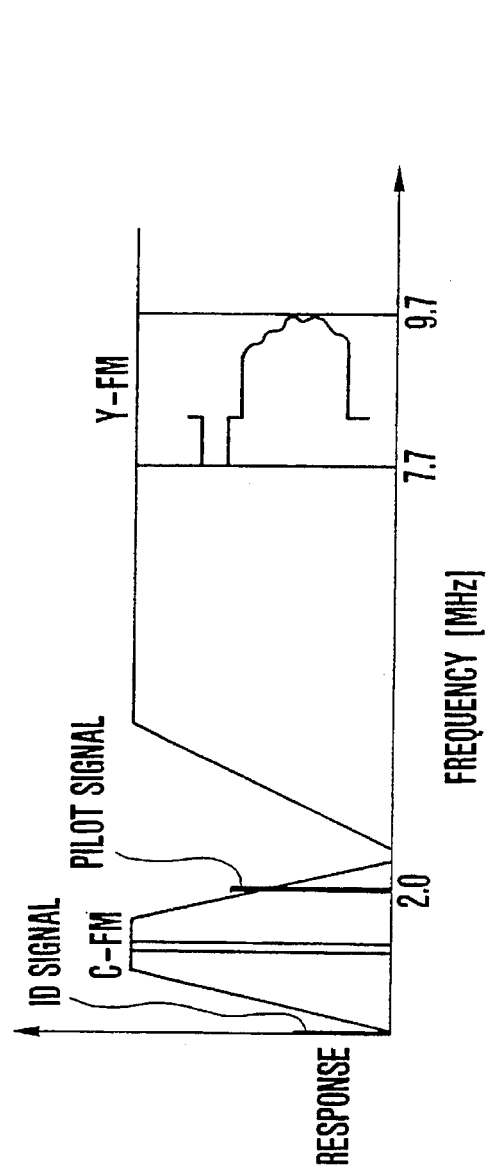
FIG. 5
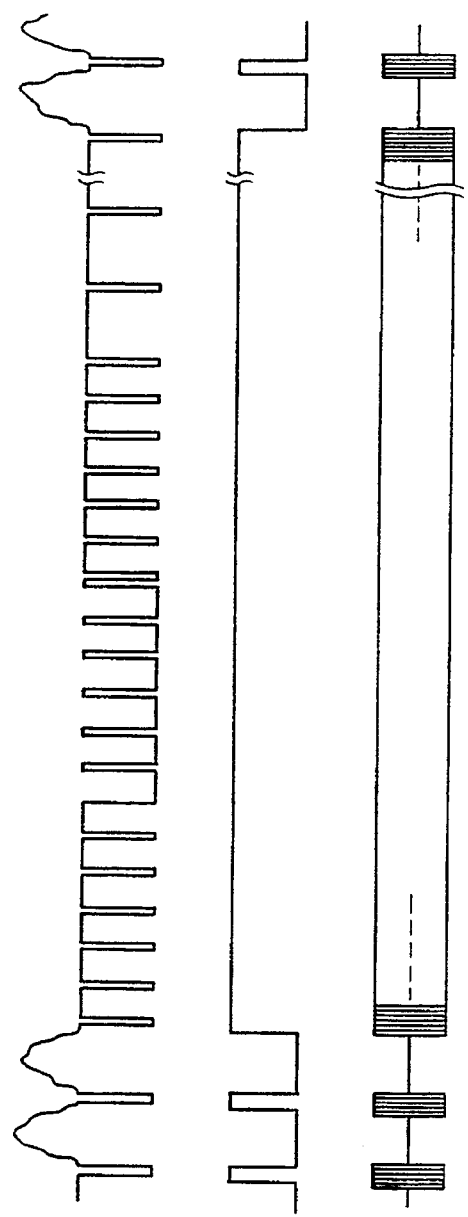
FIG.6(a) Y+S
FIG.6(b) C-BLK
FIG.6(c) fp

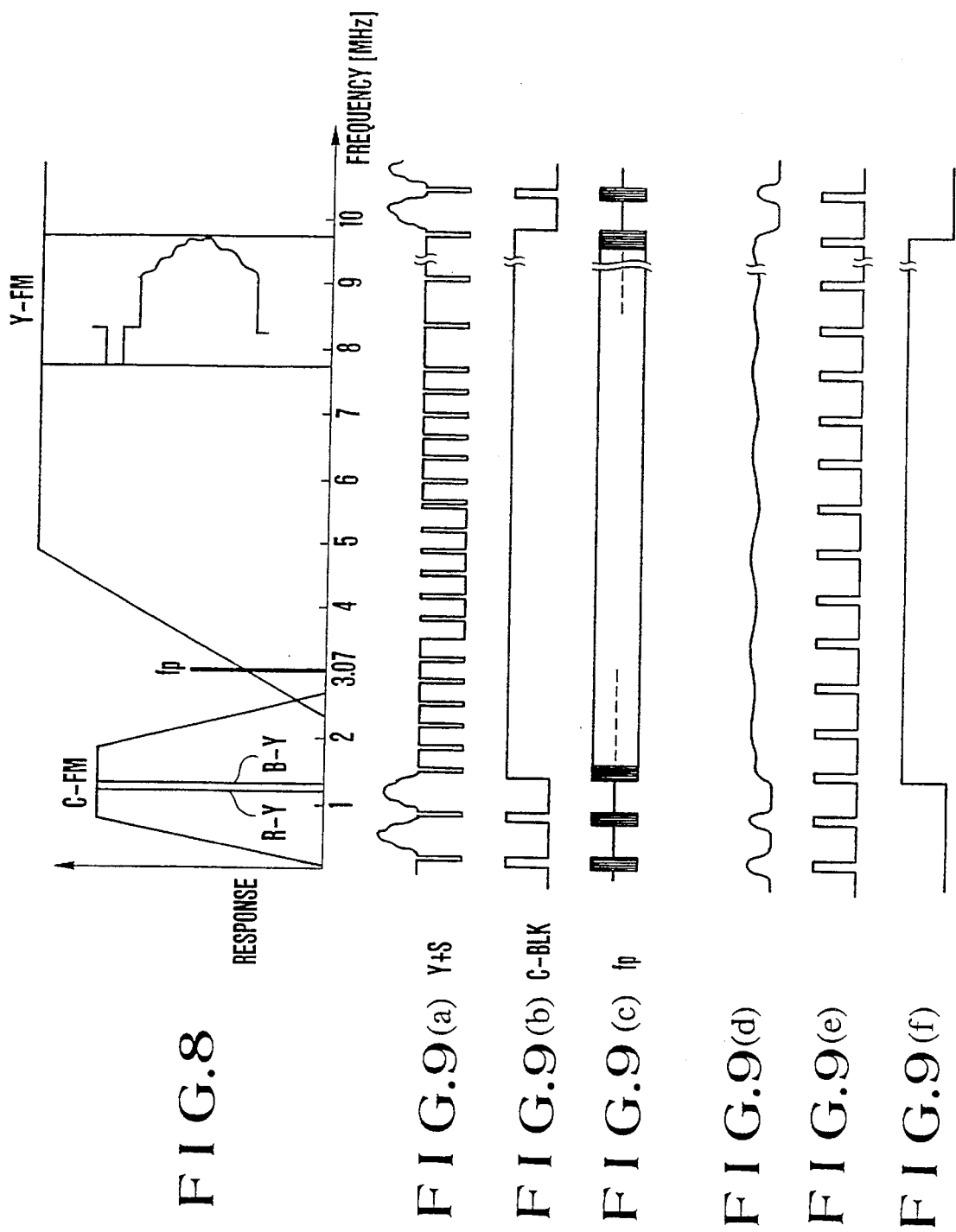

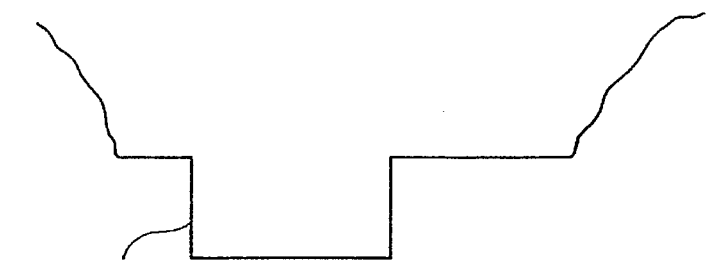
F I G. 15 (a)
HORIZONTAL SYNC SIGNAL
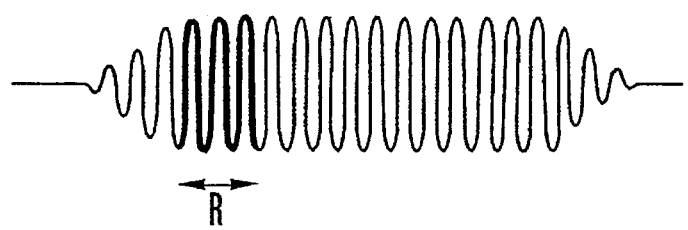
F I G. 15 (b)
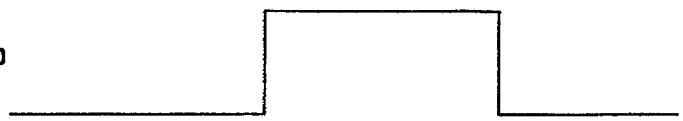
F I G. 15 (c) GP
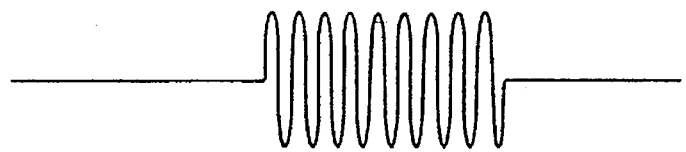
F I G. 15 (d)
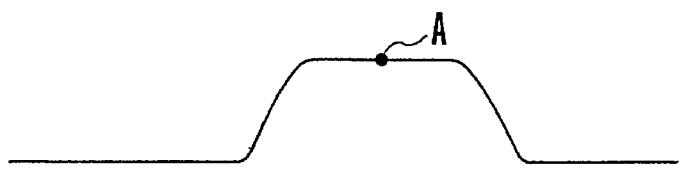
F I G. 15 (e) Vd
F I G. 15 (f) CP

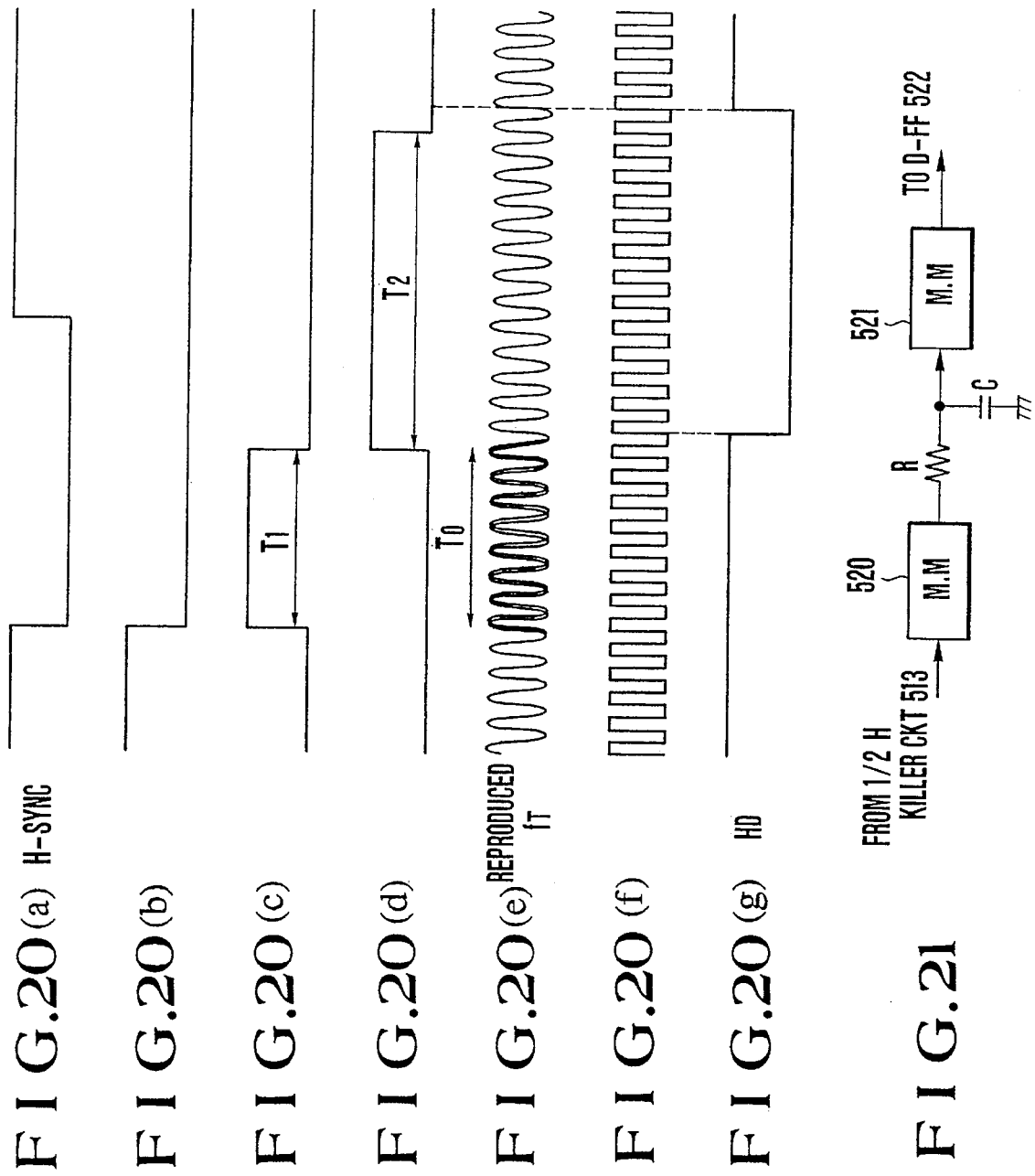

IMAGE SIGNAL RECORDING AND REPRODUCING SYSTEM

This is a continuation application under 37 CFR 1.62 of prior application Ser. No. 08/050 757, filed Apr. 20, 1993, abandoned, which is a continuation of Ser. No. 07/610,092, filed Nov. 6, 1990, abandoned.

BACKGROUND OF THE INVENTION

1. Field of the Invention

The present invention relates to an image signal recording and reproducing system for recording an image signal on a recording medium and for reproducing a recorded image signal from the recording medium.

2. Description of the Related Art

It has heretofore been known that an image signal recording and reproducing system for recording an image signal on a recording medium and for reproducing a recorded image signal from the recording medium, such as a video tape recorder or an electronic still video camera, has the function of displaying a reproduced image signal on a television monitor or the like as a video image. However, such a system can be used in various other applications. In one application, after a reproduced image signal for one picture is temporarily stored in a memory or the like, the stored image signal may be read out to produce a hardcopy of an image corresponding to the read image signal by means of a printer. In another application, an image signal read from the memory may be transmitted to a remote location by means of a transmission device.

To suppress time base variations which may occur in an image signal during reproduction from a recording medium, such a system is commonly arranged to perform so-called TBC (time base correction) processing when the image signal reproduced from the recording medium is to be stored in the memory. The TBC processing generally includes the steps of forming a clock signal having time base variations equivalent to those of a reproduced image signal, digitizing the reproduced image signal in synchronization with the clock signal, storing the digital image signal in a memory, reading the stored digital image signal from the memory in synchronization with a clock signal having no time base variations, and restoring it to an analog signal.

The above-described TBC processing commonly utilizes either of the following methods to form the clock signal having time base variations equivalent to those of a reproduced image signal.

The first method includes the steps of separating a synchronizing signal from a reproduced image signal and forming, through a PLL (phase-locked loop) circuit, a gated oscillator or the like, a clock signal phase-synchronized with, for example, the falling edge of the separated synchronizing signal.

However, the first method has a number of problems. For example, noise or the like may occur during reproduction, resulting in degradation of a reproduced image signal. Although an image signal is emphasized and then frequency-modulated during recording, if overmodulation occurs in this process, the waveform or phase of an edge portion of a synchronizing signal included in the reproduced image signal is impaired. As a result, it may be impossible to accurately separate the synchronizing signal and hence to effect highly accurate TBC processing.

To cope with the above-described problem, the second method may be used which includes the steps of adding a pilot signal to an image signal in such a way that a pilot signal having a single frequency (for example, approximately 2.5 MHz) is frequency-multiplexed with an intermediate band (near approximately 2.5 MHz) between a luminance signal band (Y-FM) and a chrominance signal band (C-FM) as shown in FIG. 1, and recording the resultant signal on a recording medium. In reproduction, a clock signal is formed by a PLL circuit by using a reproduced pilot signal.

According to the above-described second method, since each pilot signal is continuously added to an image signal to be recorded, it is possible to apply highly accurate TBC processing to time base variations which may occur during reproduction.

However, if a pilot signal is to be frequency-multiplexed with an image signal in the above-described manner, it is necessary to sufficiently consider the frequency and level of the pilot signal to be multiplexed. Otherwise, the image signal suffers an adverse influence such as moiré, resulting in degradation of image quality. If a pilot signal is multiplexed with an image signal and recorded on a recording medium at a level which has no adverse influence on the image signal, a pilot signal having a high S/N ratio cannot be obtained during reproduction and highly accurate TBC processing may not be achieved.

SUMMARY OF THE INVENTION

It is, therefore, an object of the present invention to solve the above-described problems.

Another object of the present invention is to provide an image signal recording and reproducing system capable of stably recording and reproducing an image signal on and from a recording medium without being influenced by time base variations which may occur during recording or reproduction.

To achieve the above-described objects, according to one aspect of the present invention, there is provided an image signal recording and reproducing system arranged to record an image signal on a recording medium and to reproduce a recorded image signal from the recording medium. The system is provided with pilot signal Generating means for generating a pilot signal having a single frequency, pilot signal adding means for adding the pilot signal to at least one of the horizontal and vertical blanking portions of an image signal, and recording means for recording on the recording medium the image signal to which the pilot signal has been added by the pilot signal adding means.

Another object of the present invention is to provide an image signal recording and reproducing system capable of correcting time base variations which may occur during recording or reproduction, without influencing an image signal.

To achieve the above-described object, according to another aspect of the present invention, there is provided an image signal recording and reproducing system arranged to record on a recording medium an image signal formed by frequency-multiplexing a luminance signal positioned in a high frequency band with a chrominance signal positioned in a low frequency band relative to the luminance signal, and to reproduce a recorded image signal from the recording medium. The system is provided with pilot signal generating means for generating a pilot signal having a single frequency lower than the frequency band of the luminance signal and positioned in the frequency band of the chrominance signal, pilot signal adding means for adding the pilot signal to at least one of the horizontal and vertical blanking portions of an image signal, and recording means for recording on the recording medium the image signal to which the pilot signal has been added by the pilot signal adding means.

Another object of the present invention is to provide an image signal recording and reproducing system capable of stably reproducing an image signal having an accurate time base by instantaneously eliminating the time base variations of the image signal which may occur during reproduction.

To achieve the above-described object, according to another aspect of the present invention, there is provided an image signal recording and reproducing system arranged to record an image signal on a recording medium and to reproduce a recorded image signal from the recording medium. The system is provided with recording means for adding a pilot signal having a single frequency to at least the horizontal and vertical blanking portions of an image signal and recording the thus-combined image signal on the recording medium, sampling clock generating means for generating a sampling clock signal for sampling an image signal separated from a signal reproduced from the recording medium, phase comparing means for separating a pilot signal from the signal reproduced from the recording medium, making a phase-comparison between the separated pilot signal and the sampling clock signal, and outputting a phase error signal corresponding to the result of the phase-comparison, and phase controlling means arranged to hold the phase error signal outputted from the phase comparing means for a predetermined interval and control the phase of the sampling clock signal generated by the sampling clock generating means by using the phase error signal held for the predetermined interval, during the period when the signal reproduced from the recording medium corresponds to the horizontal blanking portion of the image signal, and arranged to control the phase of the sampling clock signal generated by the sampling clock generating means by using the phase error signal outputted from the phase comparing means, during the period when the signal reproduced from the recording medium corresponds to the vertical blanking portion of the image signal.

Another object of the present invention is to provide an image signal recording and reproducing system capable of effecting highly accurate correction of time base variations.

To achieve the above-described object, according to another aspect of the present invention, there is provided an image signal recording and reproducing system arranged to record an image signal on a recording medium and to reproduce a recorded image signal from the recording medium. The system is provided with recording means for adding a pilot signal having a single frequency to at least the blanking portion of an image signal and recording the thus-added image signal on the recording medium, sampling clock generating means for separating a pilot signal added to a portion of a signal reproduced from the recording medium, which portion is spaced apart by a predetermined interval from a synchronization start position in the blanking portion, and generating a sampling clock signal phase-synchronized with the separated pilot signal, and sampling means for separating an image signal from the signal reproduced from the recording medium and sampling the separated image signal in synchronization with the sampling clock signal.

Another object of the present invention is to provide an image signal recording and reproducing system capable of reproducing a high-quality image signal with its residual jitter component reduced.

To achieve the above-described object, according to another aspect of the present invention, there is provided an image signal recording and reproducing system arranged to record an image signal on a recording medium and to reproduce a recorded image signal from the recording medium. The system is provided with recording means for adding a pilot signal having a single frequency to at least the blanking portion of an image signal and recording the thus-added image signal on the recording medium, sampling clock generating means for separating a pilot signal added to the blanking portion of a signal reproduced from the recording medium and generating a sampling clock signal phase-synchronized with the separated pilot signal, memory means for separating an image signal from the signal reproduced from the recording medium, digitizing the separated image signal in synchronization with the sampling clock signal, and storing the digital image signal thus obtained, and memory controlling means for separating a synchronizing signal from the image signal reproduced from the recording medium and resetting the write address of the digital image signal in the memory in accordance with both a signal which is obtained by delaying the separated synchronizing signal by a predetermined interval and the sampling clock signal generated by the sampling clock generating means.

The above and other objects, features and advantages of the present invention will become apparent from the following detailed description of preferred embodiments of the present invention, taken in conjunction with the accompanying drawings.

BRIEF DESCRIPTION OF THE DRAWING

FIG. 1 is a schematic view showing the frequency allocation of a signal recorded on a magnetic disk in a conventional electronic still video camera;

FIGS. 3(a) to 3(c) are waveform diagrams, serving as a timing chart, of signal waveforms developed at selected points of the arrangement of FIG. 2;

FIG. 5 is a schematic view showing the frequency allocation of a signal recorded on a magnetic disk in the second embodiment shown in FIG. 4;

FIGS. 6(a) to 6(c) are waveform diagrams, serving as a timing chart, of signal waveforms developed at selected points of the arrangement of FIG. 4;

FIG. 8 is a schematic view showing the frequency allocation of a signal recorded on a magnetic disk in the third embodiment shown in FIG. 7;

FIGS. 9(a) to 9(f) are waveform diagrams, serving as a timing chart, of signal waveforms developed at selected points of the arrangement of FIG. 7;

FIGS. 15(a) to 15(f) are waveform diagrams, serving as a timing chart, of signal waveforms developed at selected points of the arrangement of FIG. 14;

FIGS. 20(a) to 20(g) are waveform diagrams serving as a timing chart which is used for explaining the operation of forming horizontal address reset pulses for an image memory in the fifth embodiment shown in FIG. 19; and FIG. 21 is a block diagram showing the arrangement of the essential portions of one modification of the fifth embodiment shown in FIG. 19.

DETAILED DESCRIPTION OF THE PREFERRED EMBODIMENT

Preferred embodiments of the present invention will be described below with reference to the accompanying drawings.

Figure 2:
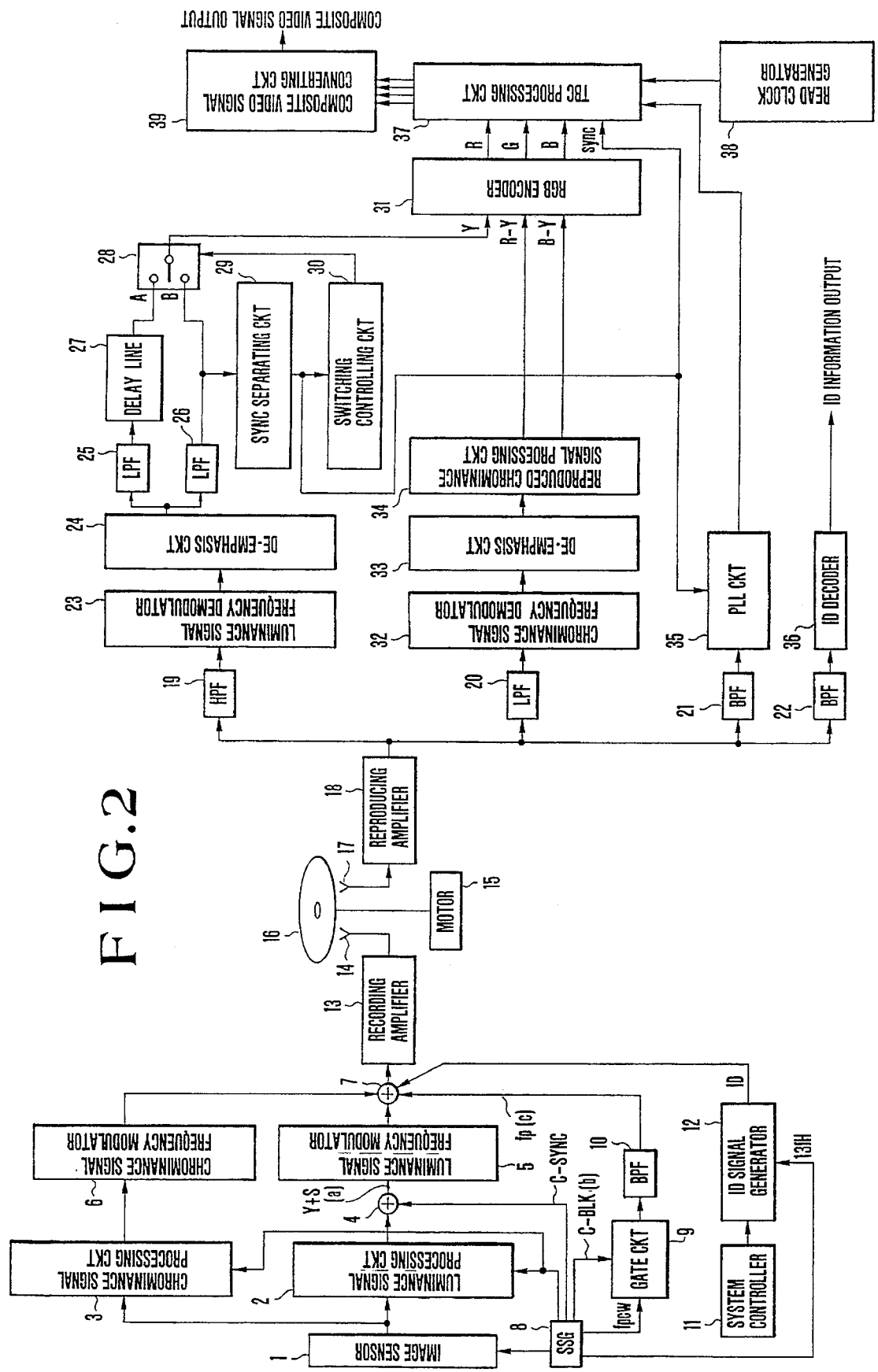
FIG. 2 is a block diagram schematically showing the arrangement of an electronic still video camera to which a first embodiment of the present invention is applied.

FIG. 2 is a block diagram schematically showing the arrangement of an electronic still video camera to which a first embodiment of the present invention is applied.

In the first embodiment, it is assumed that a pilot signal, whose frequency is, for example, 2.5 MHz and which serves as a reference signal for correction of time base variations, is frequency-multiplexed with an intermediate frequency band between the luminance signal band (indicated as Y-FM in FIG. 1) and the chrominance signal band (indicated as C-FM in FIG. 1) of an image signal, as shown in the above-described FIG. 1.

FIGS. 3(a) to 3(c) are waveform diagrams, serving as a timing chart, of signal waveforms developed at selected points of the arrangement of FIG. 2.

The operation of the arrangement shown in FIG. 2 will be described below with reference to FIGS. 3(a) to 3(c).

Initially, explanation is given of a recording operation.

Referring to FIG. 2, an image sensor 1 is driven by a driving clock signal generated by a synchronizing signal generator (SSG) 8, whereby a pixel signal corresponding to an image of a subject is outputted from the image sensor 1. This pixel signal is supplied to a luminance signal processing circuit 2 and a chrominance signal processing circuit 3.

The luminance signal processing circuit 2 forms a luminance signal from the pixel signal supplied from the image sensor 1. The luminance signal thus formed is supplied to an adder 4, where it is added to a composite synchronizing signal C-SYNC generated by the SSG 8. The output signal of the adder 4 is supplied to a luminance signal frequency modulator 5, where it is frequency-modulated into a high-frequency band signal. The high-frequency band signal is supplied to an adder 7.

In the meantime, the chrominance signal processing circuit 3 forms a color-difference line-sequential signal from the pixel signal supplied from the image sensor 1. The color-difference line-sequential signal thus formed is supplied to a chrominance signal frequency modulator 6, where it is frequency-modulated into a low-frequency band signal. The low-frequency band signal is supplied to the adder 7.

During the above-described operation, the SSG 8 successively generates a pilot signal fpcw having a single frequency such as the aforesaid frequency and supplies it to a gate circuit 9. The gate circuit 9 passes the pilot signal fpcw while a composite blanking signal (C-BLK) outputted from the SSG 8, such as the signal shown in FIG. 3(b), is in a high-level state. The pilot signal fpcw which has passed through the gate circuit 9 is applied to a band-pass filter (BPF) 10, where unwanted frequency components are removed from the pilot signal fpcw (refer to FIG. 3(c)). The output from the BPF 10 is supplied to the adder 7.

In the meantime, a system controller 11 supplies to an identification (ID) signal generator 12 information data including date, hour, minute, etc. which is associated with an image. The ID signal generator 12 performs differential phase-shift keying (DPSK) of a carrier signal 13fH supplied from the SSG 8 in accordance with the information data suppled from the system controller 11, to form and supply an ID signal to the adder 7.

In the adder 7, the frequency-modulated luminance signal supplied from the luminance signal frequency modulator 5, the frequency-modulated color-difference line-squential signal supplied from the chrominance signal frequency modulator 6, a pilot signal fp supplied from the BPF 10 and the ID signal supplied from the ID signal generator 12 are added together. The resultant signal is amplified to a predetermined level by a recording amplifier 13, and is then recorded, by a magnetic head 14, on a magnetic disk 16 which is being rotated at a predetermined rotational speed by a motor 15.

A reproducing operation will be described below.

Referring again to FIG. 2, a recorded signal is reproduced by a magnetic head 17 from the magnetic disk 16 which is being rotated at the predetermined rotational speed by the motor 15. The reproduced signal is amplified to a predetermined level by a reproducing amplifier 18 and is then supplied to a high-pass filter (HPF) 19, a low-pass filter (LPF) 20 and band-pass filters (BPFs) 21 and 22.

The HPF 19 separates a frequency-modulated luminance signal component from the input reproduced signal. The separated frequency-modulated luminance signal component is demodulated by a luminance signal frequency demodulator 23, and the demodulated signal is subjected to de-emphasis processing in a de-emphasis circuit 24. The output from the de-emphasis circuit 24 is supplied to each of low-pass filters (LPFs) 25 and 26.

The LPF 25 has a transmission bandwidth wider than the LPF 26. The luminance signal, whose unnecessary frequency component signal has been eliminated by the LPF 25, is delayed by a predetermined time period by a delay line 27, and is then applied to the A terminal of a switch 28. The delay line 27 serves to establish the relative timing of a signal having passed through the LPF 25 and that having passed through the LPF 26 which will be described later.

The LPF 26, which has a transmission bandwidth narrower than the LPF 25, eliminates an unnecessary frequency component signal from the input luminance signal. The LPF 26 supplies the resultant signal to the B terminal of the switch 28 and a sync separating circuit 29.

The sync separating circuit 29 separates a composite synchronizing signal from the luminance signal supplied from the LPF 26. The separated composite synchronizing signal is supplied to a switch controlling circuit 30, a PLL circuit 35 and a TBC processing circuit 37 all of which follow the LPF 29.

The switch controlling circuit 30 controls the switching operation of the switch 28 in accordance with the composite synchronizing signal supplied from the sync separating circuit 29 so that the wiper of the switch 28 is kept in contact with the B terminal during the period when the pilot signal is multiplexed with the image signal, that is, during horizontal and vertical blanking periods, and so that the wiper is kept in contact with the A terminal during the period when no pilot signal is multiplexed with the image signal.

The luminance signal outputted from the switch 28, which is controlled in the above-described manner by the switch controlling circuit 30, is supplied to an RGB encoder 31.

The LPF 20 separates a frequency-modulated color-difference line-sequential signal component from the input reproduced signal. The frequency-modulated color-difference line-sequential signal thus separated is demodulated in a chrominance signal frequency demodulator 32. The demodulated signal is subjected to de-emphasis processing in a de-emphasis circuit 33. The output from the de-emphasis circuit 33 is supplied to a reproduced chrominance signal processing circuit 34, where it is subjected to line-simultaneous conversion and is then converted into two kinds of color-difference signals: R-Y and B-Y. The R-Y and B-Y color-difference signals are supplied to the RGB encoder 31.

The RGB encoder 31 forms RGB signals by using the luminance signal Y supplied from the switch 28 and the color-difference signals R-Y and B-Y outputted from the reproduced chrominance signal processing circuit 34. The RGB signals are supplied to the TBC processing circuit 37.

The BPF 21 extracts the pilot signal fp from the supplied reproduced signal, and the extracted pilot signal fp is supplied to the PLL circuit 35.

The PLL circuit 35 operates in synchronization with the composite synchronizing signal supplied from the sync separating circuit 29 and reads from the signal supplied from the BPF 21 a signal which is supplied during the horizontal and vertical blanking periods of the image signal, by means of a gate circuit disposed in the PLL circuit 35. The signal inputted through the gate circuit and a sampling clock signal generated by a voltage-controlled oscillator (VCO) or the like disposed in the PLL circuit 35 are phase-compared with each other by a phase comparator or the like which is disposed in the PLL circuit 35. The oscillation frequency of the VCO is controlled in accordance with the result of the phase comparison made by the phase comparator so that the PLL circuit 35 forms a sampling clock signal which follows a jitter occurring in the pilot signal fp extracted from the reproduced signal by the BPF 21. The sampling clock signal is supplied to the TBC processing circuit 37.

The PLL circuit 35 is also arranged so that the result of phase-comparison provided by the phase comparator is sampled and held by a sample and hold circuit or the like disposed in the PLL circuit 35 during the period when the signal supplied from the BPF 21 is not read into the PLL circuit 35 through the gate circuit. During this period, the oscillation frequency of the VCO disposed in the PLL circuit 35 is controlled in accordance with the phase-comparison result which is sampled and held by the sample and hold circuit.

The TBC processing circuit 37 converts the RGB signals supplied from the RGB encoder 31 and the composite synchronizing signal (Sync) supplied from the sync separating circuit 29 into corresponding digital signals in synchronization with the sampling clock signal supplied from the PLL circuit 35. The digital signals are stored at write addresses in an image memory disposed in the TBC processing circuit 37, which are specified in synchronization with the sampling clock signal.

When RGB signals and Sync signals for one picture are stored in the image memory, read addresses are specified in synchronization with an accurate clock signal supplied from a read clock generator 38, and the digital RGB signals and Sync signals stored in the image memory are read from the read addresses. The digital RGB and Sync signals are converted into analog form in synchronization with the accurate clock signal. The analog RGB and Sync signals are converted into a composite video signal according to, for example, NTSC standards in a composite video signal conversion circuit 39. The composite video signal is provided at the output of the circuit 39 as an image signal which is free from time base variations which have occurred during reproduction.

The BPF 22 extracts an ID signal component from the supplied reproduced signal. An ID decoder 36 decodes the ID signal extracted by the BPF 22 and outputs ID information.

Although the first embodiment has been described with reference to the electronic still video camera, the present invention is also applicable to various imaging devices, such as video tape recorders and optical video disk devices, without reducing the above-described advantages and effects.

As is apparent from the foregoing, in the first embodiment, a pilot signal for correction of time base variations is frequency-multiplexed with the horizontal and vertical blanking portions of an image signal, whereby it is possible to achieve highly accurate TBC processing without adversely affecting the image.

The reproducing part is arranged so that the portion of an image signal with which a pilot signal for correction of time base variations is frequency-multiplexed and the portion of the image signal with which no pilot signal is frequency-multiplexed are separated from a reproduced signal by means of filters having different transmission bandwidths. Accordingly, it is possible to substantially eliminate the influence of the pilot signal upon the image signal.

When a composite synchronizing signal contained in an image signal reproduced from a recording medium is to be separated by a sync separating circuit or the like, even if the aforesaid pilot signal is mixed with the composite synchronizing signal, the signal component contained in the portion of the image signal to which the pilot signal is frequency-multiplexed, that is, the horizontal or vertical blanking portion of the image signal which includes a portion to which the composite synchronizing signal is added, passes through the narrower-bandwidth filter and is then supplied to the above-described sync separating circuit. Accordingly, it is possible to prevent the pilot signal from adversely affecting the separation of synchronizing signals, whereby reliable and stable sync separation can be achieved.

As is apparent from the foregoing, in accordance with the first embodiment, it is possible to provide an image signal recording and reproducing system capable of stably recording and reproducing an image signal on and from a recording medium without being influenced by time base variations which may occur during recording or reproduction.

Figure 4:
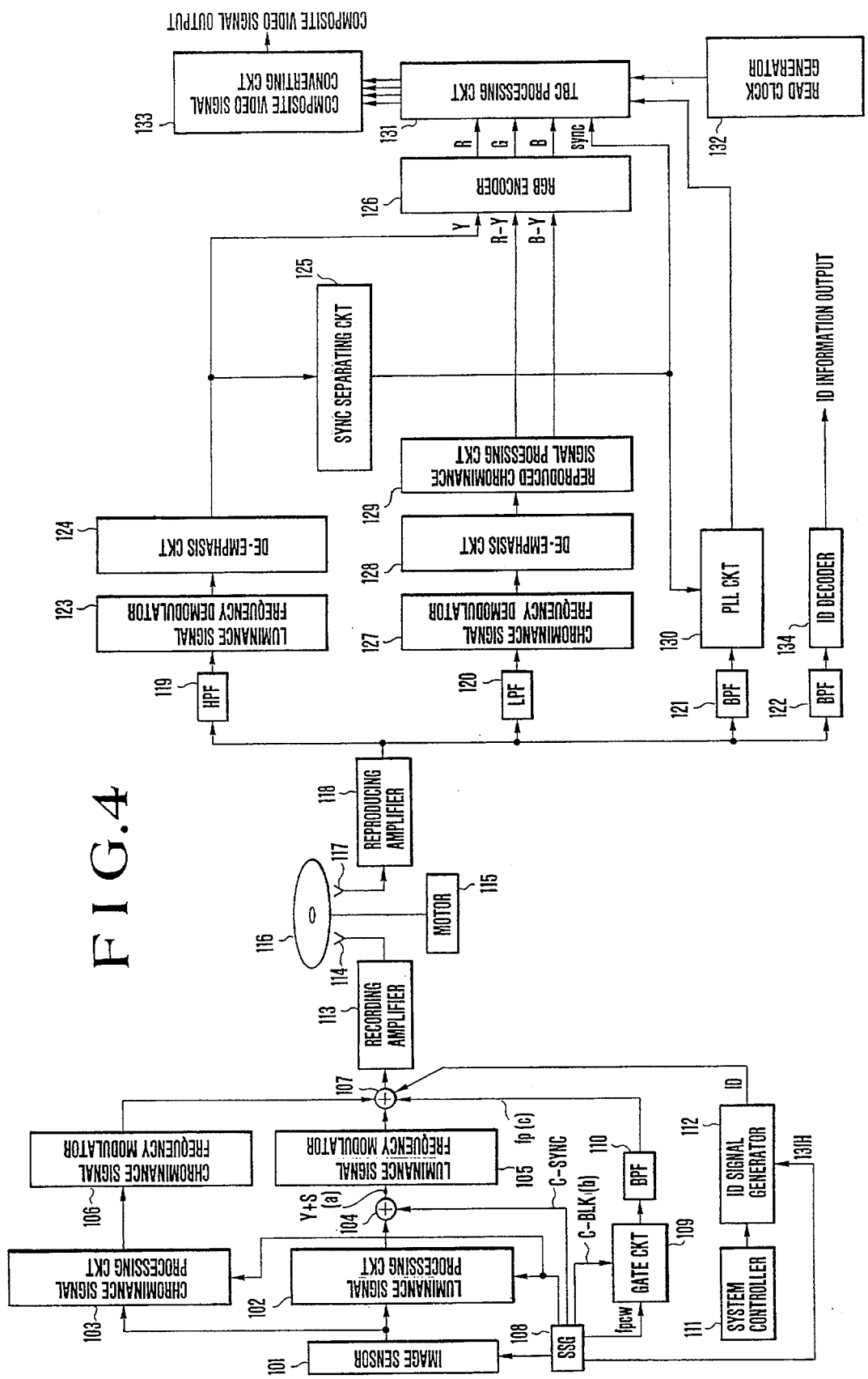
FIG. 4 is a block diagram schematically showing the arrangement of an electronic still video camera to which a second embodiment of the present invention is applied.

FIG. 4 is a block diagram schematically showing the arrangement of an electronic still video camera to which a second embodiment of the present invention is applied.

In the second embodiment, it is assumed that a pilot signal, whose frequency is, for example, 2.0 MHz and which serves as a reference signal for correction of time base variations, is frequency-multiplexed with a frequency band somewhat offset toward a chrominance signal band (indicated as C-FM in FIG. 5) between the chrominance signal band C-FM and the luminance signal band (indicated as Y-FM in FIG. 5) of an image signal, as shown in FIG. 5.

FIGS. 6(a) to 6(c) are waveform diagrams, serving as a timing chart, of signal waveforms developed at selected points of the arrangement of FIG. 4.

The operation of the arrangement shown in FIG. 4 will be described below with reference to FIGS. 6(a) to 6(c).

Initially, explanation is given of a recording operation.

Referring to FIG. 4, an image sensor 101 is driven by a driving clock signal generated by a synchronizing signal generator (SSG) 108, whereby a pixel signal corresponding to an image of a subject is outputted from the image sensor 101. This pixel signal is supplied to a luminance signal processing circuit 102 and a chrominance signal processing circuit 103.

The luminance signal processing circuit 102 forms a luminance signal from the pixel signal supplied from the image sensor 101. The luminance signal thus formed is supplied to an adder 104, where it is added to a composite synchronizing signal C-SYNC generated by the SSG 108 (refer to FIG. 6(a)). The output signal of the adder 104 is supplied to a luminance signal frequency modulator 105, where it is frequency-modulated into a high-frequency band signal. The high-frequency band signal is supplied to an adder 107.

In the meantime, the chrominance signal processing circuit 103 forms a color-difference line-squential signal from the pixel signal supplied from the image sensor 101. The color-difference line-sequential signal thus formed is supplied to a chrominance signal frequency modulator 106, where it is frequency-modulated into a low-frequency band signal. The low-frequency band signal is supplied to the adder 107.

During the above-described operation, the SSG 108 successively generates a pilot signal fpcw having a single frequency such as the aforesaid frequency and supplies it to a gate circuit 109. The gate circuit 109 passes the pilot signal fpcw while a composite blanking signal (C-BLK) outputted from the SSG 108, such as the signal shown in FIG. 6(b), is in a high-level state. The pilot signal fpcw which has passed through the gate circuit 109 is applied to a band-pass filter (BPF) 110, where unwanted frequency components are removed from the pilot signal fpcw (refer to FIG. 6 (c) ). The output from the BPF 110 is supplied to the adder 107.

In the meantime, a system controller 111 supplies to an ID signal generator 112 information data including date, hour, minute, etc., which is associated with an image. The ID signal generator 112 performs differential phase-shift keying (DPSK) of a carrier signal 13 fH supplied from the SSG 108 in accordance with the information data suppled from the system controller 111, to form and supply an ID signal to the adder 107.

In the adder 107, the frequency-modulated luminance signal supplied from the luminance signal frequency modulator 105, the frequency-modulated color-difference line-sequential signal supplied from the chrominance signal frequency modulator 106, a pilot signal fp supplied from the BPF 110 and the ID signal supplied from the ID signal generator 112 are added together. The resultant signal is amplified to a predetermined level by a recording amplifier 113, and is then recorded, by a magnetic head 114, on a magnetic disk 116 which is being rotated at a predetermined rotational speed by a motor 115.

A reproducing operation will be described below.

Referring again to FIG. 4, a recorded signal is reproduced by a magnetic head 117 from the magnetic disk 116 which is being rotated at the predetermined rotational speed by the motor 115. The reproduced signal is amplified to a predetermined level by a reproducing amplifier 118 and is then supplied to a high-pass filter (HPF) 119, a low-pass filter (LPF) 120 and band-pass filters (BPFs) 121 and 122.

The HPF 119 separates a frequency-modulated luminance signal component from the input reproduced signal. The separated frequency-modulated luminance signal component is demodulated by a luminance signal frequency demodulator 123, and the demodulated signal is subjected to de-emphasis processing in a de-emphasis circuit 124. The output from the de-emphasis circuit 124 is supplied to each of low-pass filters (LPFs) 125 and 126.

The sync separating circuit 125 separates a composite synchronizing signal from the luminance signal supplied from the de-emphasis circuit 124. The separated composite synchronizing signal is supplied to a PLL circuit 130 and a TBC processing circuit 131.

The LPF 120 separates a frequency-modulated color-difference line-sequential signal component from the input reproduced signal. The frequency-modulated color-difference line-sequential signal thus separated is demodulated in a chrominance signal frequency demodulator 127. The demodulated signal is subjected to de-emphasis processing in a de-emphasis circuit 128. The output from the de-emphasis circuit 128 is supplied to a reproduced chrominance signal processing circuit 129, where it is subjected to line-simultaneous conversion and is then converted into two kinds of color-difference signals: R-Y and B-Y. The R-Y and B-Y color-difference signals are supplied to the RGB encoder 126.

The RGB encoder 126 forms RGB signals by using the luminance signal Y supplied from the de-emphasis circuit 124 and the color-difference signals R-Y and B-Y outputted from the reproduced chrominance signal processing circuit 129. The RGB signals are supplied to the TBC processing circuit 131.

The BPF 121 extracts the pilot signal fp from the supplied reproduced signal, and the extracted pilot signal fp is supplied to the PLL circuit 130.

The PLL circuit 130 operates in synchronization with the composite synchronizing signal supplied from the sync separating circuit 125 and reads from the signal supplied from the BPF 121 a signal which is supplied during the horizontal and vertical blanking periods of the image signal, by means of a gate circuit disposed in the PLL circuit 130. The signal inputted through the gate circuit and a sampling clock signal generated by a voltage-controlled oscillator (VCO) or the like disposed in the PLL circuit 130 are phase-compared with each other by a phase comparator or the like which is disposed in the PLL circuit 130. The oscillation frequency of the VCO is controlled in accordance with the result of the phase comparison made by the phase comparator so that the PLL circuit 130 forms a sampling clock signal which follows a jitter occurring in the pilot signal fp extracted from the reproduced signal by the BPF 121. The sampling clock signal is supplied to the TBC processing circuit 131.

The PLL circuit 130 is also arranged so that the result of phase-comparison provided by the phase comparator is sampled and held by a sample and hold circuit or the like disposed in the PLL circuit 130 during the period when the signal supplied from the BPF 121 is not read into the PLL circuit 130 through the gate circuit. During this period, the oscillation frequency of the VCO disposed in the PLL circuit 130 is controlled in accordance with the phase-comparison result which is sampled and held by the sample and hold circuit.

The TBC processing circuit 131 converts the RGB signals supplied from the RGB encoder 126 and the composite synchronizing signal (Sync) supplied from the sync separating circuit 125 into corresponding digital signals in synchronization with the sampling clock signal supplied from the PLL circuit 130. The digital signals are stored at write addresses in an image memory disposed in the TBC processing circuit 131, which are specified in synchronization with the sampling clock signal.

When RGB signals and Sync signals for one picture are stored in the image memory, read addresses are specified in synchronization with an accurate clock signal supplied from a read clock generator 132 and the digital RGB signals and Sync signals stored in the image memory are read from the read addresses. The digital RGB and Sync signals are converted into analog form in synchronization with the accurate clock signal. The analog RGB and Sync signals are converted into a composite video signal according to, for example, NTSC standards in a composite video signal conversion circuit 133. The composite video signal is provided at the output of the circuit 133 as an image signal which is free from time base variations which have occurred during reproduction.

The BPF 122 extracts an ID signal component from the supplied reproduced signal. An ID decoder 134 decodes the ID signal extracted by the BPF 122 and outputs ID information.

Although the second embodiment has been described with reference to the electronic still video camera, the present invention is also applicable to various imaging devices, such as video tape recorders and optical video disk devices, without reducing the above-described advantages and effects.

As described above, in the second embodiment, a pilot signal, whose frequency is, for example, 2.0 MHz and which serves as a reference signal for correction of time base variations, is frequency-multiplexed with a frequency band somewhat offset toward the chrominance signal band of an image signal between the chrominance signal band and the luminance signal band of the image signal, and this multiplexed signal is recorded on a magnetic disk. Accordingly, since the frequency of the pilot signal is lowered, even if relatively large time base variations occur during reproduction, the time base variations can be corrected with high precision, and luminance signals, particularly, synchronizing signals added thereto are prevented from being adversely affected.

According to the second embodiment, a pilot signal is multiplexed with the horizontal and vertical blanking portions of an image signal. Therefore, even if a pilot signal is frequency-multiplexed in the state of overlapping the chrominance signal band of an image signal, the chrominance signal is not seriously influenced. This is because the synchronizing signal portion of a chrominance signal is used for clamping the chrominance signal. In other words, even if a small amount of high-frequency component leaks into the synchronizing signal portion, such a component is averaged as a result of the clamping to such an extent that it does not influence the clamped chrominance signal.

Although the second embodiment has been described with reference to the example in which the present invention is applied to a system for recording and reproducing color image signals, the present invention is also applicable to a system for recording and reproducing black-and-white image signals. In this application, the present invention is far more useful since no chrominance signal is present in a low frequency band unlike the aforesaid system for recording and reproducing color image signals. It is, therefore, unnecessary to allow for the influence of pilot signals on chrominance signals.

As is apparent from the foregoing, in accordance with the second embodiment, it is possible to provide an image signal recording and reproducing system capable of stably recording and reproducing an image signal on and from a recording medium without being influenced by time base variations which may occur during recording or reproduction.

The method of multiplexing a pilot signal with a portion having no image signal to correct time base variations has, however, a number of disadvantages. As is known, a pilot signal, which is inputted to the phase comparator of a reproducing part, has a frequency spectrum in which a number of sideband signals are spaced apart at intervals of 15.7 KHz (horizontal synchronizing frequency) on either side of the center frequency. If a reproduced signal is interrupted, for example, if the variation of the rotational speed of a magnetic disk is large, when the magnetic head is travelling between recording tracks on the magnetic disk, or if successive dropouts occur in a reproduced signal over one or more horizontal synchronizing periods, a sampling clock signal fs will synchronize with a frequency of (fp±15.7 KHz)×N (fp is the frequency of a pilot signal and N is an integer). If a reproduced signal becomes able to be again obtained, it takes a long time to generate a sampling clock signal which is phase-synchronized with a pilot signal. During this time, it is impossible to implement highly accurate TBC processing.

Figure 7:
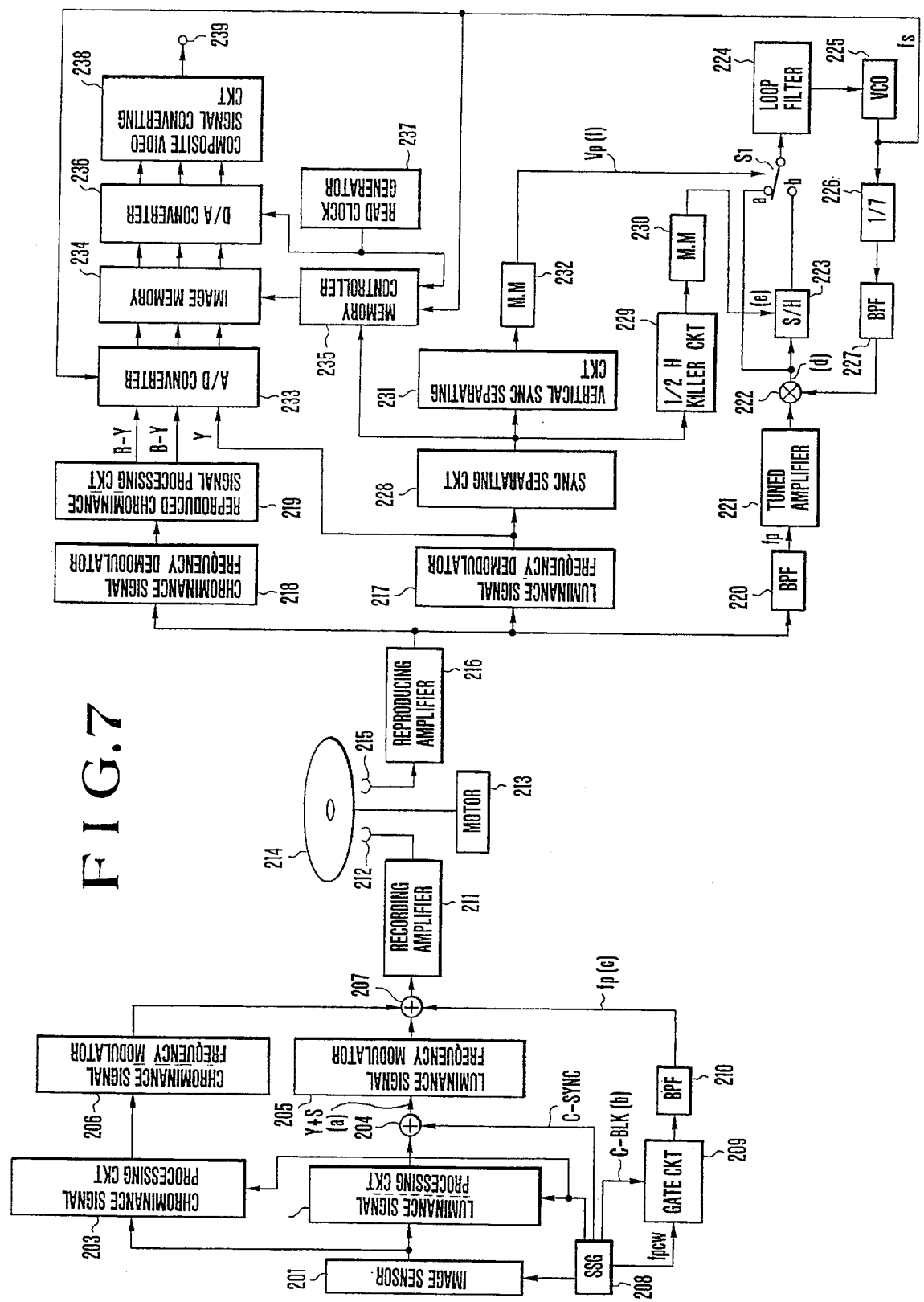
FIG. 7 is a block diagram schematically showing the arrangement of an electronic still video camera to which a third embodiment of the present invention is applied.

FIG. 7 is a block diagram schematically showing the arrangement of an electronic still video camera to which a third embodiment of the present invention is applied. The electronic still video camera according to the third embodiment is capable of stably reproducing an image signal having an accurate time base by instantaneously eliminating the time base variations of the image signal which may occur during reproduction, thereby solving the above-described problems.

FIG. 8 is a diagram showing the frequency allocation of an image signal recorded on the magnetic disk of FIG. 7. In the third embodiment, it is assumed that a pilot signal, whose frequency is, for example, 195 fH (fH is a horizontal synchronization frequency and 195 fH is approximately 3.07 MHz), is frequency-multiplexed, as a reference signal for correction of time base variations, with an intermediate frequency band between the luminance signal band (indicated as Y-FM in FIG. 8) and chrominance signal band (indicated as C-FM in the same figure) of an image signal, as shown in the above-described FIG. 8.

FIGS. 9(a) to 9(f) are waveform diagrams, serving as a timing chart, of signal waveforms developed at selected points of the arrangement of FIG. 7.

The operation of the arrangement shown in FIG. 7 will be described below with reference to FIGS. 9(a) to 9(f).

Initially, explanation is given of a recording operation.

Referring to FIG. 7, an image sensor 201 is driven by a driving clock signal generated by a synchronizing signal generator (SSG) 208, whereby a pixel signal corresponding to an image of a subject is outputted from the image sensor 201. This pixel signal is supplied to a luminance signal processing circuit 202 and a chrominance signal processing circuit 203.

The luminance signal processing circuit 202 forms a luminance signal from the pixel signal supplied from the image sensor 201. The luminance signal thus formed is supplied to an adder 204, where it is added to a composite synchronizing signal C-SYNC generated by the SSG 208. The output signal of the adder 204 is supplied to a luminance signal frequency modulator 205, where it is frequency-modulated into a high-frequency band signal. The high-frequency band signal is supplied to an adder 207.

In the meantime, the chrominance signal processing circuit 203 forms a color-difference line-squential signal from the pixel signal supplied from the image sensor 201. The color-difference line-sequential signal thus formed is supplied to a chrominance signal frequency modulator 206, where it is frequency-modulated into a low-frequency band signal. The low-frequency band signal is supplied to the adder 207.

During the above-described operation, the SSG 208 successively generates a pilot signal fpcw having a single frequency such as the aforesaid frequency and supplies it to a gate circuit 209. The gate circuit 209 passes the pilot signal fpcw while a composite blanking signal (C-BLK) outputted from the SSG 208, such as the signal shown in FIG. 9(b), is in a high-level state. The pilot signal fpcw which has passed through the gate circuit 209 is applied to a band-pass filter (BPF) 210, where unwanted frequency components are removed from the pilot signal fpcw (refer to FIG. 9(c)). The output from the BPF 210 is supplied to the adder 207.

In the adder 207, the frequency-modulated luminance signal supplied from the luminance signal frequency modulator 205, the frequency-modulated color-difference line-sequential signal supplied from the chrominance signal frequency modulator 206 and a pilot signal fp supplied from the BPF 210 are added together. The resultant signal is amplified to a predetermined level by a recording amplifier 211, and is then recorded, by a magnetic head 212, on a magnetic disk 214 which is being rotated at a predetermined rotational speed by a motor 213.

A reproducing operation will be described below.

Referring again to FIG. 7, a recorded signal is reproduced by a magnetic head 215 from the magnetic disk 214 which is being rotated at the predetermined rotational speed by the motor 213. The reproduced signal is amplified to a predetermined level by a reproducing amplifier 216 and is then supplied to a luminance signal frequency demodulator 217, a chrominance signal frequency demodulator 218 and a BPF 220.

The luminance signal frequency demodulator 217 demodulates a luminance signal from the input reproduced signal, and supplies it to a sync separating circuit 228 and an A/D converter 233.

The chrominance signal frequency demodulator 218 demodulates a color-difference line-sequential signal from the input reproduced signal. The demodulated color-difference line-sequential signal is supplied to a reproduced chrominance signal processing circuit 219, where it is subjected to line-simultaneous conversion and converted into two kinds of color-difference signals: R-Y and B-Y. The R-Y and B-Y color-difference signals are supplied to the A/D converter 233.

The BPF 220 extracts the pilot signal fp from the supplied reproduced signal, and the extracted pilot signal fp is supplied to a tuned amplifier 221. The tuned amplifier 221 amplifies the pilot signal fp to a predetermined level and supplies it to a phase comparator 222.

A voltage-controlled oscillator (VCO) 225 generates a sampling clock signal fs of frequency 6fsc (fsc is a color subcarrier frequency and 6fsc is approximately 21.47 MHz). The sampling clock signal fs is frequency-divided by seven in a frequency divider (÷7) 226, and is then supplied to a BPF 227, where its unwanted frequency components are eliminated. The output from the BPF 227 is supplied to the phase comparator 222. The phase comparator 222 outputs a phase error voltage signal Vd (refer to FIG. 9(d)) corresponding to the phase error between both input signals during each of horizontal and vertical blanking periods. The phase error voltage signal Vd is supplied to a sample and hold (S/H) circuit 223 and the terminal of a switch S1.

The S/H circuit 223 is supplied with a sample and hold pulse (refer to FIG. 9(e)) which is generated by a monostable multi-vibrator (M•M) 230 in synchronization with a synchronizing signal which is separated by the sync separating circuit 228 and whose equalizing pulses are eliminated by a ½ H killer circuit 229. The S/H circuit 223 samples and holds the phase error voltage signal Vd outputted from the phase comparator 222 in each horizontal synchronizing period, and supplies it to the b terminal of the switch S1.

A vertical sync separating circuit 231 separates a vertical synchronizing signal from the composite synchronizing signal separated by the sync separating circuit 228. The switching operation of the switch S1 is controlled by a vertical blanking pulse signal Vp (refer to FIG. 9(f)) which is generated by the M•M 232 in synchronization with the vertical synchronizing signal.

More specifically, the wiper of the switch S1 is kept in contact with the a terminal of FIG. 7 during a vertical blanking period in which the vertical blanking pulse signal Vp is held at a high level and a sequence of pilot signals is extracted from a reproduced signal. During the other periods, the wiper is kept in contact with the b terminal of FIG. 7.

Accordingly, a sequence of phase error voltage signals is supplied from the switch S1 to the next loop filter 224 during the period when reproduced signals for a vertical blanking period (approximately 20 H) are outputted from the magnetic head 215. During the other periods, the sampled-and-held phase error voltage signal is supplied to the loop filter 224 in each horizontal synchronizing period.

The integration-type loop filter 224 consisting of an operational amplifier or the like eliminates the high-frequency components from the phase error voltage signal, and supplies the result to the VCO 225, thereby controlling the oscillation frequency of the VCO 225. Accordingly, if a reproduced signal is interrupted, for example, if the variation of the rotational speed of the magnetic disk 214 is large, when the magnetic head 215 is travelling between recording tracks on the magnetic disk 214, or if successive dropouts occur in a reproduced signal over one or more horizontal synchronizing periods, a sequence of pilot signals can be obtained during the vertical blanking period of a signal reproduced from each recording track. Accordingly, a PLL (phase-locked loop) circuit which forms the sampling clock signal fs phase-synchronized with the pilot signal, that is, a circuit consisting of the elements 222 to 227 and the switch S1 in FIG. 7, is necessarily locked to the frequency indicated by the pilot signal after the magnetic disk 214 has started rotating.

The VCO 225 outputs the sampling clock signal fs which is phase-synchronized with a pilot signal having the same time base variations as the reproduced image signal. The sampling clock signal fs is supplied to the A/D converter 233 and a memory controller 235.

The A/D converter 233 digitizes the luminance signal supplied from the luminance signal frequency demodulator 217 and the two kinds of color-difference signals R-Y and B-Y supplied from the reproduced chrominance signal processing circuit 219, in synchronization with the sampling clock signal fs supplied from the VCO 225. The memory controller 235 specifies write addresses in an image memory 234 in synchronization with such a sampling clock signal fs, and the luminance signal and the two kinds of color-difference signals R-Y and B-Y digitized by the A/D converter 233 are stored in the image memory 234.

When luminance signals and color-difference signals of the two kinds for one picture are stored in the image memory 234, the memory controller 235 specifies read addresses in synchronization with an accurate clock signal supplied from a read clock generator 237, and the digital luminance signals and the two kinds of color-difference signals R-Y and B-Y stored in the image memory 234 are read out and supplied to a D/A converter 236.

The D/A converter 236 converts the digital luminance signals and the digital color-difference signals R-Y, B-Y into analog form in synchronization with the accurate clock signal. These analog signals are converted into a composite video signal according to, for example, NTSC standards in a composite video signal conversion circuit 238. The composite video signal is provided at an output 239 as an image signal which is free from time base variations which have occurred during reproduction.

Although, in the third embodiment described above, a pilot signal is added to the vertical blanking portion of an image signal, the pilot signal may be added to any portion of the image signal in which an image part does not exist. For example, the addition of the pilot signal may be started at the recording start position of a signal to be recorded on a magnetic disk, which position is prescribed in an electronic still video format, that is, at a position which precedes the leading edge of a vertical synchronizing signal by a 7 H (H: one horizontal synchronizing period). In this method, the period during which the pilot signal is added can be prolonged and the phase-synchronization interval of the aforesaid PLL circuit can be extended, whereby far more stable TBC processing can be achieved.

Figure 10:
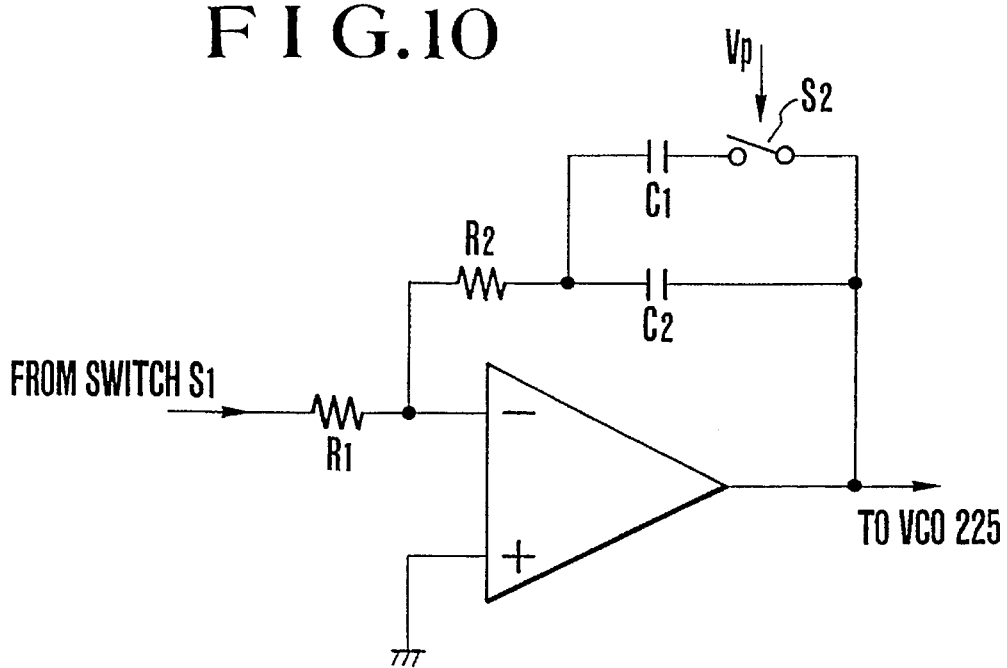
FIGS. 10 and 11 are diagrams showing the arrangements of different loop filters suitable for use in the third embodiment shown in FIG. 7.
Figure 11:
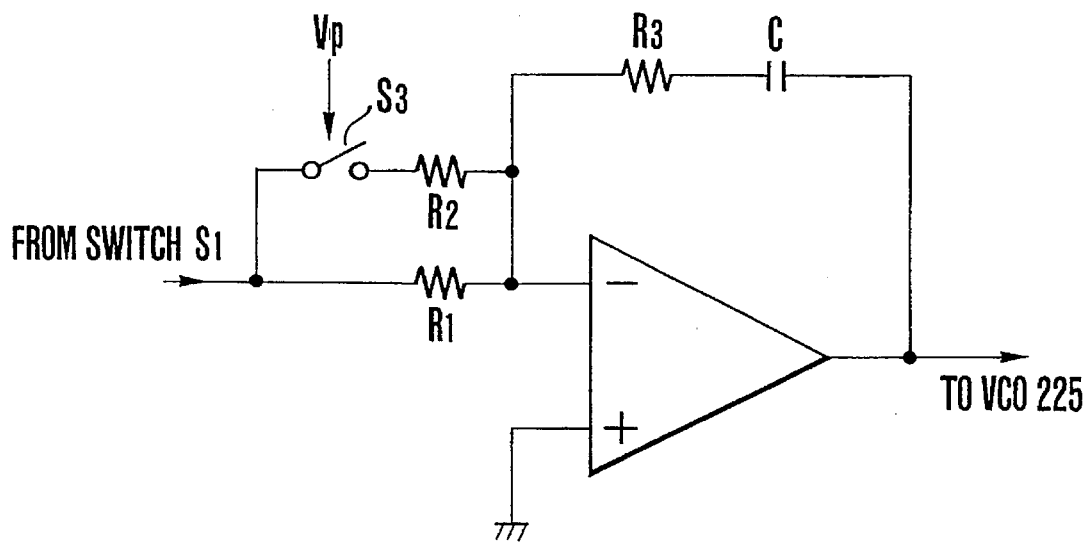

It has been stated that the third embodiment is arranged to supply the phase error voltage signal formed by using a pilot signal added to the vertical blanking portion of an image signal and the phase error voltage signal formed by using a pilot signal added to the horizontal blanking portion of the image signal, to a loop filter of the constant characteristic. However, an arrangement may be adopted for adaptively changing the characteristics of the PLL circuit which is operative to switch the constants of the loop filter in response to the two phase error voltage signals by utilizing the vertical blanking pulse Vp outputted from the M•M 232 as a control signal. With this arrangement, it is possible to utilize the function of the PLL circuit more reliably. FIGS. 10 and 11 show specific examples of the above-described arrangement.

FIG. 10 is a diagram showing the arrangement of a loop filter which is designed to switch the values of capacitors serving as an integrator which constitutes part of the loop filter in response to the vertical blanking pulse Vp, thereby changing the capture range of the PLL circuit.

In FIG. 10, when the vertical blanking pulse Vp is at a high level, a switch S2 is turned off, and during the other periods, it is turned on. The capture range of the PLL circuit is therefore expanded during the period when the sampling clock signal fs is phase-synchronized with a pilot signal added to the vertical blanking portion of an image signal. Accordingly, even if the rotational speed of the magnetic disk 214 varies greatly, the PLL circuit can be locked in phase.

FIG. 11 is a diagram showing the arrangement of a loop filter which is designed to switch the resistance values of an integrator which constitutes part of the loop filter in response to the vertical blanking pulse Vp, thereby changing the loop gain of the PLL circuit.

In FIG. 11, when the vertical blanking pulse Vp is at a high level, a switch S3 is turned on, and during the other periods, it is turned off. The loop gain of the PLL circuit is therefore increased during the period when the sampling clock signal fs is phase-synchronized with a pilot signal added to the vertical blanking portion of an image signal. Accordingly, the phase-synchronizing operation of the PLL circuit is not easily influenced by external noise or the like.

Although the third embodiment has been described with reference to the electronic still video camera, the present invention is also applicable to various imaging devices, such as video tape recorders and optical video disk devices, without reducing the above-described advantages and effects.

As is apparent from the foregoing, according to the third embodiment, it is possible to provide an image signal recording and reproducing system capable of stably reproducing an image signal having an accurate time base by instantaneously eliminating the time base variations of the image signal which may occur during reproduction.

Figure 12A:
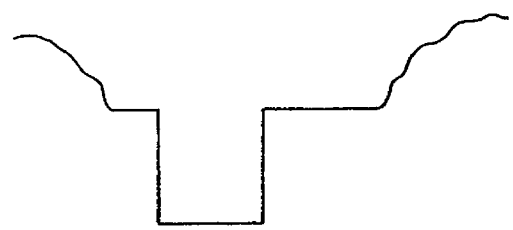
FIGS. 12(a) to 12(c) and 13(a) to 13(c) are waveform diagrams which are used for explaining problems experienced with the above-described embodiments.
Figure 12B:
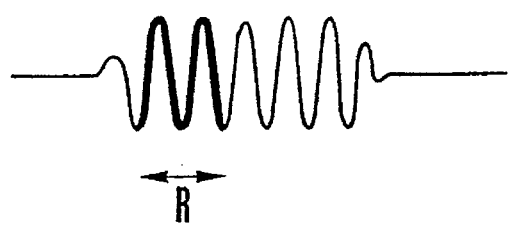
Figure 12C:
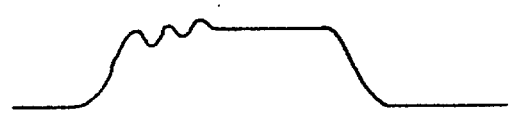

The method of multiplexing a pilot signal with a horizontal blanking portion having no image part to correct time base variations has, however, a number of disadvantages. In this method, the pilot signal is multiplexed with the entire horizontal blanking portion of an image signal. Therefore, as shown in FIG. 12(b), the sideband signal of a frequency-modulated wave which corresponds to the leading edge of a horizontal synchronizing signal (refer to FIG. 12(a)), leaks into the pilot signal, so that phase variations appear at a position corresponding to the leading edge of the horizontal synchronizing signal of the pilot signal and continue for a predetermined interval (R in FIG. 12(b)). Accordingly, a phase comparator outputs an incorrect phase error voltage signal (refer to FIG. 12(c)), so that no satisfactory TBC processing can be achieved.

Figure 13A:
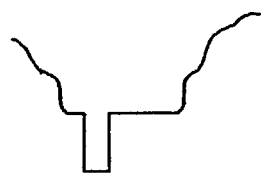
Figure 13B:
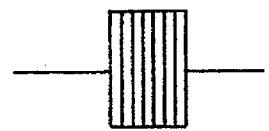
Figure 13C:
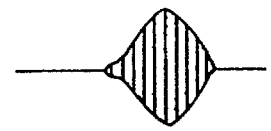

Another method may be employed. For example, as shown in FIG. 13(b), a pilot signal may be multiplexed in offset relationship to the leading edge of the horizontal synchronizing signal (FIG. 13(a)) of an image signal so that the sample-and-hold timing of an S/H circuit is delayed during reproduction, thereby eliminating the influence of the leading edge of the horizontal synchronizing signal. In this method, however, the characteristic of a BPF which separates the pilot signal needs to be set to a sharp one. The envelope of the pilot signal separated by the thus-set BPF exhibits a nonuniform amplitude as shown in FIG. 13(c). If such a pilot signal is used, the phase error voltage signal outputted from a phase comparator shows an unreliable value.

Figure 14:
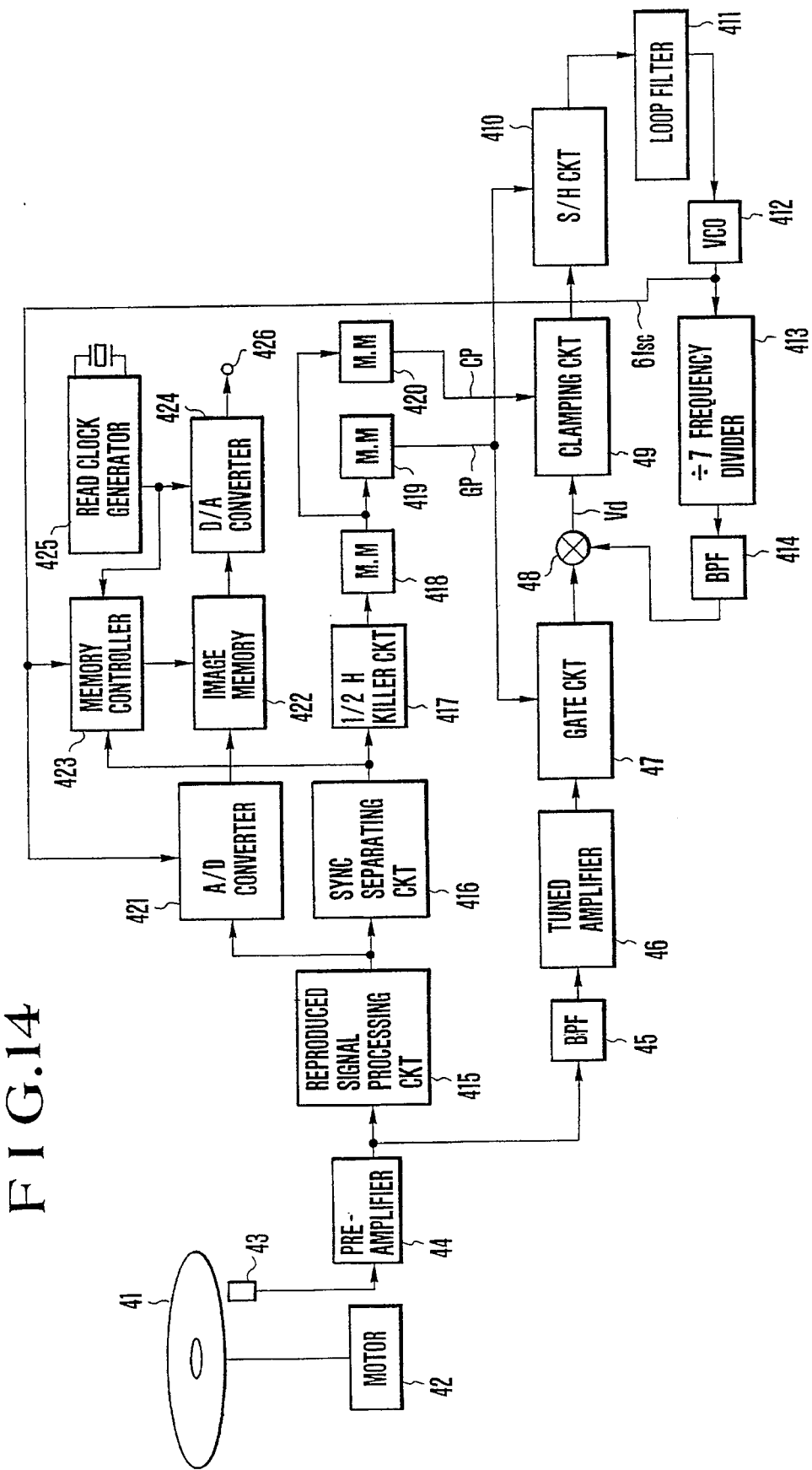
FIG. 14 is a block diagram schematically showing the arrangement of the reproducing part of an electronic still video camera to which a fourth embodiment of the present invention is applied.

FIG. 14 is a block diagram schematically showing the arrangement of the reproducing part of an electronic still video camera to which a fourth embodiment of the present invention is applied. The electronic still video camera according to the fourth embodiment is capable of stably recording and reproducing an image signal on and from a recording medium without being influenced by the time base variations of the image signal which may occur during recording or reproduction.

It is assumed here that fifty recording tracks are concentrically formed on a magnetic disk from which image signals are reproduced by the reproducing part shown in FIG. 14. It is also assumed that, as shown in FIG. 8, a pilot signal is recorded on each recording track and the pilot signal, whose frequency is, for example, 195 fH (fH is a horizontal synchronizing frequency and 195 fH is approximately 3.07 MHz), is frequency-multiplexed over the entire horizontal blanking period of an image signal in an intermediate frequency band between the luminance signal band (indicated as Y-FM in FIG. 8) and the chrominance signal band (indicated as C-FM in FIG. 8) of the image signal.

FIGS. 15(a) to 15(f) are waveform diagrams, serving as a timing chart, of signal waveforms developed at selected points of the arrangement of FIG. 14.

The operation of the arrangement shown in FIG. 14 will be described below with reference to FIGS. 15(a) to 5(f).

Referring to FIG. 14, a magnetic disk 41, on which image signals and pilot signals are recorded in the above-described manner, is rotated at a predetermined rotational speed by a motor 42. A magnetic head 43 traces a particular track on the magnetic disk 1 to reproduce the recorded signal. The reproduced signal is amplified to a predetermined level by a pre-amplifier 44, and is then supplied to a reproduced signal processing circuit 415 and a BPF 45.

The reproduced signal processing circuit 415 restores the input reproduced signal to an image signal (refer to FIG. 15(a)), and supplies it to a sync separating circuit 416 and an A/D converter 421.

The sync separating circuit 416 separates a synchronizing signal from the image signal restored by the reproduced signal processing circuit 415, and the synchronizing signal is supplied to a ½ H killer circuit 417 and a memory controller 423.

The ½ H killer circuit 417 eliminates an equalizing pulse from the synchronizing signal separated by the sync separating circuit 416, and the synchronizing signal having no equalizing pulse is supplied to a monostable multi-vibrator (M•M) 418. The M•M 418 and an M•M 419 form a gate pulse GP such as that shown in FIG. 15(c), and the gate pulse GP is supplied to a gate circuit 47 and an S/H circuit 410.

In the meantime, the BPF 45 extracts a pilot signal from the reproduced signal supplied from the pre-amplifier 44, and the extracted pilot signal is supplied to the next-stage tuned amplifier 46. The tuned amplifier 46 amplifies the pilot signal to a predetermined level (refer to FIG. 15(b)) and supplies it to the gate circuit 47.

The gate circuit 47 passes the pilot signal supplied from the tuned amplifier 46 during the high-level state of the gate pulse GP supplied from the M•M 419, thereby eliminating the portion shown as R in FIG. 15(b), that is, the portion in which phase variations occur due to the sideband signals of a frequency-modulated wave which correspond to the leading edge of the horizontal synchronizing signal (refer to FIG. 15(d)). The pilot signal outputted from the gate circuit 47 is supplied to the next-stage phase comparator 48.

In the meantime, a sampling clock signal 6fsc generated by a VCO 412 is frequency-divided by seven in a frequency divider (÷7) 413, and is then supplied to a BPF 414, where its unwanted frequency components are eliminated. The output from the BPF 414 is supplied to the phase comparator 48. The phase comparator 48 outputs a phase error voltage signal Vd (refer to FIG. 15(e)) corresponding to the phase error between both input signals.

The phase error voltage signal Vd outputted from the phase comparator 48 is supplied to a clamping circuit 49. The clamping circuit 49 eliminates DC variations by using a clamp pulse CP, such as that shown in FIG. 15(f), formed by the M•Ms 418 and 420. The output from the clamping circuit 49 is supplied to the S/H circuit 410.

The S/H circuit 410 is supplied with the gate pulse GP as described above. The S/H circuit 410 samples and holds the phase error voltage signal Vd outputted from the clamping circuit 49, during each horizontal synchronizing period. The sampled-and-held phase error voltage signal Vd is supplied to an integration-type loop filter 411 consisting of an operational amplifier or the like. The loop filter 411 eliminates the high-frequency components from the phase error voltage signal Vd, and supplies the result to the VCO 412, thereby controlling the oscillation frequency of the VCO 412. In this manner, the VCO 412 outputs the sampling clock signal 6fsc which tracks the time base variations contained in the pilot signal extracted from the reproduced signal. The sampling clock signal 6fsc is supplied to an A/D converter 421 and the memory controller 423.

As described above, the sampling clock signal 6fsc which tracks the time base variations contained in the pilot signal extracted from the reproduced signal is derived from a sampling clock signal which is phase-synchronized with a pilot signal from which has been removed a portion in which phase variations occur due to the sideband signals of a frequency-modulated wave which corresponds to the leading edge of a horizontal synchronizing signal. Accordingly, it is possible to provide a sampling clock signal which highly accurately tracks the pilot signal extracted from the reproduced signal.

The A/D converter 421 digitizes the reproduced image signal supplied from the reproduced signal processing circuit 415, in synchronization with the sampling clock signal 6fsc supplied from the VCO 412. Then, a memory controller 423 specifies write addresses in an image memory 422 in synchronization with the sampling clock signal 6fsc outputted from the VCO 412, whereby the reproduced image signal digitized by the A/D converter 421 is stored in the image memory 422.

When an image signal for one picture is stored in the image memory 422, the memory controller 423 specifies read addresses in the image memory 422 in synchronization with an accurate clock signal supplied from a read clock generator 425, and the digital image signal stored in the image memory 422 is read out and supplied to a D/A converter 424. The D/A converter 424 converts the digital image signal into analog form in synchronization with the accurate clock signal. This analog signal is provided at an output 426 as an image signal which is free from time base variations which have occurred during reproduction.

The above-described fourth embodiment is arranged in such a manner that the gate pulse GP which is used for gating a pilot signal is utilized as a sample-and-hold pulse for use in sampling and holding the phase error voltage signal vd. However, as shown in FIG. 15(e), the phase error voltage signal Vd tends to exhibit unstable levels at the rising and falling edges of its waveform. If the phase error voltage Vd is sampled and held at the timing of the gate pulse GP as described above, the tracking accuracy of the sampling clock signal 6fsc with respect to a reproduced pilot signal may be impaired.

To cope with this problem, the monostable multi-vibrator which forms a pulse having a narrower pulse width than the gate pulse GP is arranged so that the phase error voltage signal Vd can be sampled and held at the timing that the level of the phase error voltage signal Vd stabilizes (at the middle position of the gate pulse GP as indicated by A in FIG. 15(e)). Accordingly, it is possible to stabilize and improve the tracking accuracy of the sampling clock signal 6fsc.

Although the fourth embodiment has been described with reference to the reproducing part of the electronic still video camera, the present invention is also applicable to various imaging devices, such as video tape recorders and optical video disk devices, without reducing the above-described advantages and effects.

As is apparent from the foregoing, according to the fourth embodiment, it is possible to provide an image signal recording and reproducing system capable of stably recording and reproducing an image signal on and from a recording medium without being influenced by the time base variations of the image signal which may occur during recording or reproduction.

A fifth embodiment of the present invention will be described below.

It is well known that various proposals have been made as to a high-definition electronic still video system capable of recording and reproducing a higher-definition image than those recorded and reproduced by conventional electronic still video systems. In such a high-definition electronic still video system, one still picture is formed by four field images, and field image signals corresponding to the respective field images are recorded on four tracks on a magnetic disk without altering a conventional recording format including a frequency-modulating carrier frequency used to frequency-modulate a luminance signal, a recording track pattern and the like. The four field image signals reproduced from the four tracks on the magnetic disk are reconstructed by means of an image memory. They are converted into a still image signal which has resolution approximately twice that of a conventional still image horizontally and vertically, and are then displayed on a monitor or outputted as a hardcopy through a video printer.

Figure 16:
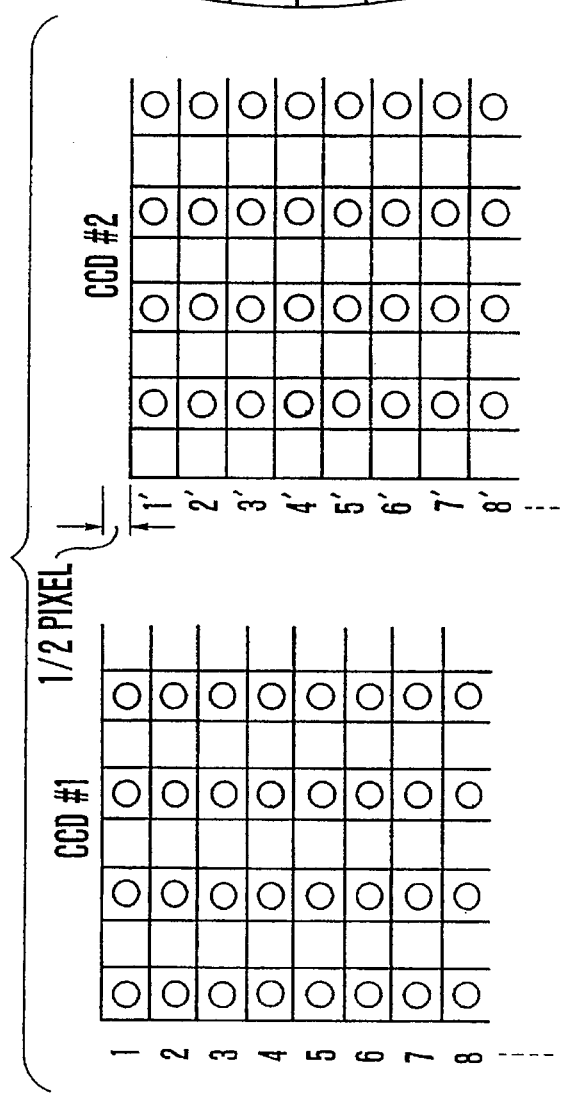
FIG. 16 is a schematic view showing the arrangement of sample pixels of respective CCDs which are offset from each other by one-half pixel in the vertical direction.

More specifically, the above-described system is provided with a video camera unit of the two-CCD type including black-and-white imaging CCDs #1 and #2 each having, for example, 500 pixels (vertical)×500 pixels (horizontal) which, as shown in FIG. 16, are offset from each other by one-half pixel perpendicularly to a subject. The video camera unit samples pixel information stored at the positions indicated by "o" in FIG. 16. Then, the system simultaneously reads the odd fields (1, 3, 5 . . . and 1', 3', 5'. . . ) of the respective CCDs #1 and #2 and the even fields (2, 4, 6 . . . and 2', 4', 6'. . . ) of the same, and record them on the magnetic disk the form of a pattern such as that shown in FIG. 17.

Figure 18:
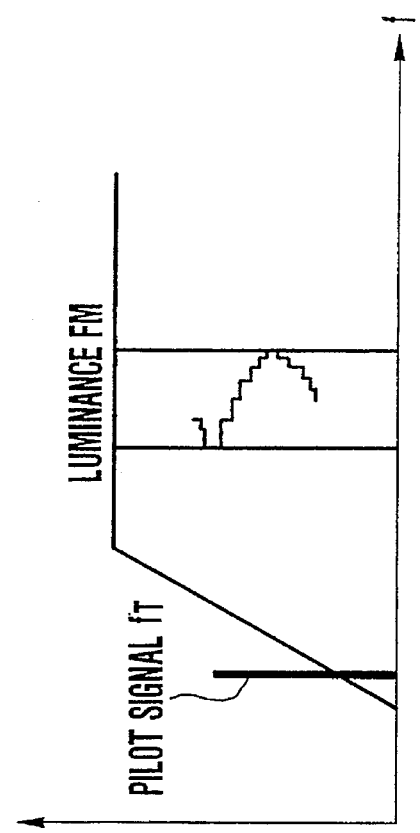
FIG. 18 is a schematic view showing the frequency allocation of a frequency-modulated image signal and a pilot signal which are recorded on a magnetic disk.

The system is also arranged to multiplex, as shown in FIG. 18, a pilot signal fT with the lower sideband of an image signal and record the multiplexed signal on the magnetic disk so as to form, during reproduction, a sampling clock which has a jitter component substantially equal to that of an image signal reproduced from the magnetic disk when the reproduced image signal is to be stored in an image memory.

Figure 19:
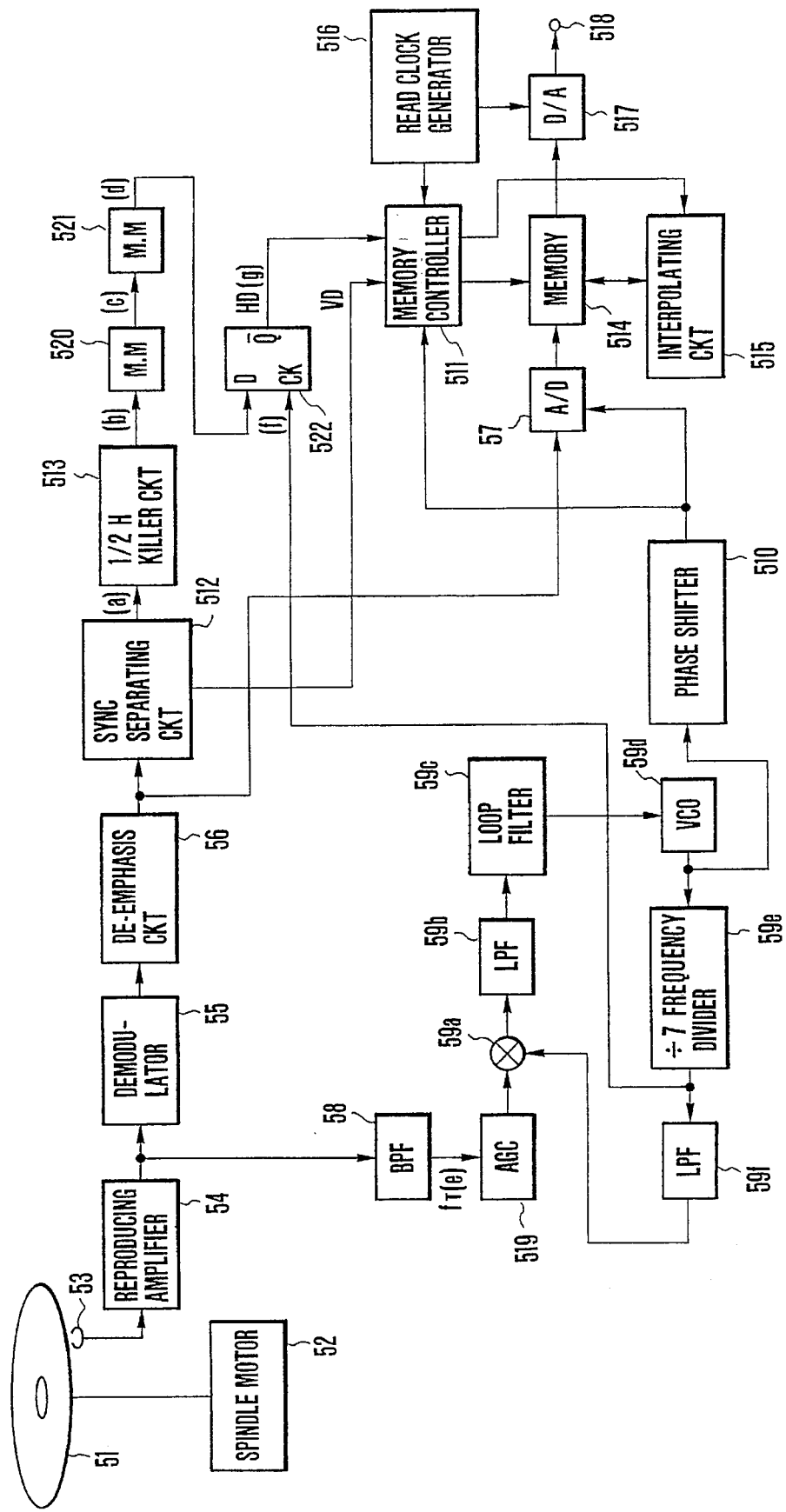
FIG. 19 is a block diagram schematically showing the arrangement of an image signal reproducing apparatus to which a fifth embodiment of the present invention is applied.

FIG. 19 is a block diagram schematically showing the arrangement of the image signal reproducing apparatus of such a high-definition electronic still video camera to which the fifth embodiment of the present invention is applied.

In FIG. 19, reference numeral 51 denotes a video floppy disk 51, and the illustrated reproducing apparatus comprises a spindle motor 52, a magnetic head 53, a reproducing amplifier 54, a demodulator 55, a de-emphasis circuit 56, an A/D converter 57, a BPF 58 for extracting a pilot signal of frequency 195 fH (3.07 MHz), a phase comparator 59a, an LPF 59b, a loop filter 59c for determining a PLL loop characteristic, a VCO 59d for generating a sampling clock fs (6 fsc ≠21.48 MHz), a ÷7 frequency divider 59e for dividing by seven the frequency of the sampling clock fs supplied from the VCO 59d, and an LPF 59f for extracting a fundamental wave component (195 fH) from the signal outputted from the divider 59e, the phase comparator 59a to the LPF 59f constituting a PLL circuit. The reproducing apparatus also comprises a phase shifter 510 for controlling the phase of the sampling clock fs outputted from the VCO 59d, a memory controller 511, a sync separating circuit 512, a ½ H killer circuit 513, an image memory 514, an interpolating circuit 515, a read clock generator 516, a D/A converter 517, an image signal output terminal 518, an automatic gain control (AGC) amplifier 519 for holding the amplitude of the pilot signal extracted by the BPF 58, monostable multi-vibrators (M•Ms) 520 and 521, and a D flip-flop 522.

The operation of the image signal reproducing apparatus shown in FIG. 19 will be described below.

Figure 17:
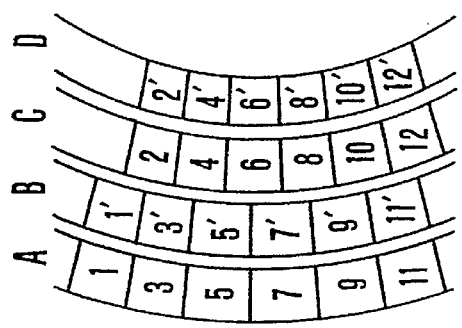
FIG. 17 is a schematic view showing a recording pattern which is formed on a magnetic disk when high-definition still image signals for one picture are recorded on four tracks.

Referring to FIG. 19, image signals are recorded on recording tracks in the form of the recording pattern shown in FIG. 17. Initially, the signals recorded on the track indicated by A are reproduced by the magnetic head 53 and amplified by the reproducing amplifier 54. The amplifier output is demodulated by the demodulator 55, and its noise component is suppressed by the de-emphasis circuit 56. The output from the de-emphasis circuit 56 is supplied to the A/D converter 57.

In the meantime, the reproduced signal amplified by the reproducing amplifier 54 is also supplied to the BPF 58, where a pilot signal of frequency 195 fH (3.07 MHz) is extracted. The pilot signal is fixed to a predetermined amplitude level by the AGC amplifier 519, and is supplied to one input terminal of the phase comparator 59a.

The VCO 59d generates a sampling clock signal fs (6 fsc) and supplies it to the frequency divider (÷7) 59e. The frequency divider (÷7) 59e divides the input frequency by seven and supplies the result to an LPF 59f, where its high-frequency components are eliminated. The LPF 59f provides the thus-obtained sine-wave signal of frequency 195 fH to the other input terminal of the phase comparator 59a.

The phase comparator 59a outputs a signal having components corresponding to the sum of the frequencies of the two input signals and the difference therebetween. The LPF 59b extracts only a signal having a component corresponding to the difference between the frequencies of the two input signals, and outputs an error signal. The error signal outputted from the LPF 59b is integrated by the loop filter 59c and supplied to the VCO 59d, whereby the sampling clock signal fs outputted from the VCO 59d is phase-synchronized with the pilot signal separated from the reproduced signal.

The operation of forming a horizontal address reset pulse HD for the image memory 514 in the image signal reproducing apparatus shown in FIG. 19, will be described below with reference to the timing chart shown in FIGS. 20(a) to 20(g).

The synchronizing signal (FIG. 20(a)) separated from the reproduced signal by the sync separating circuit 512 is supplied to the ½ H killer circuit 513, where its equalizing pulse is eliminated. The ½ H killer circuit 513 outputs a signal (refer to FIG. 20(*b*)) whose frequency is a horizontal synchronizing frequency (15.734 KHz). This signal is supplied to the M•M 520. The M•M 520 generates a positive pulse signal of time $T_1$, such as that shown in FIG. 20(*c*), in synchronization with the falling timing of the signal shown in FIG. 20 (*b*).

It is to be noted that the time T1 is selected to be approximately equal to the interval (time T0 in FIG. 20 (*e*)) of a pilot signal during which the phase is varied due to the leakage of the sideband of the falling edge of the horizontal synchronizing signal of a frequency-modulated image signal.

The pulse signal outputted from the M•M 520 is supplied to the M•M 521, which in turn outputs a positive pulse signal of time T2 in synchronization with the falling timing of the input pulse signal, as shown in FIG. 20 (*d*). The time T2 is selected to have the time width required to reset the horizontal addresses in the image memory 514. The pulse signal (refer to FIG. 20 (*d*)) outputted from the M•M 521 is supplied to the D terminal of the D-FF 522. Supplied to the CK terminal of the D-FF 522 is a pulse signal (refer to FIG. 20(*f*)) which is phase-synchronized with the pilot signal fT (refer to FIG. 20 (*e*)) outputted from the ÷7 frequency divider 59*e*. The D-FF 522 latches the pulse signal, shown in FIG. 20 (*d*), provided at the D terminal at the rising timing of the pulse signal shown in FIG. 20(*f*), and outputs the negative pulse signal shown in FIG. 20(*g*) from the $\overline{Q}$ terminal. This pulse signal is supplied to the memory controller 511 as a horizontal address reset pulse HD for the image memory 514.

The thus-formed horizontal address reset pulse HD for the image memory 514 is not influenced by the variations of the edge portions of the horizontal synchronizing signal as compared to a case where the synchronizing signal separated from an image signal reproduced and demodulated from a magnetic disk is used as a horizontal address reset pulse for the image memory 514. As described above, in accordance with the fifth embodiment, the horizontal address reset pulse HD for the image memory 514 is formed by using the portion of a pilot signal which does not suffer phase variations due to the leakage of the sideband of the falling edge of the horizontal synchronizing signal of a frequency-modulated image signal. Accordingly, it is possible to accurately reset the horizontal addresses in the image memory 514.

The image signal reproduced and demodulated from the A track of FIG. 17 is converted into digital data by the A/D converter 57, and is then stored at predetermined addresses in the image memory 514. Similarly, the image signals recorded on the B, C and D tracks of FIG. 17 are sequentially reproduced, demodulated and stored in the image memory 514, whereby four fields of digital image signals are stored in the image memory 514. These digital image signals are then read from the image memory 514 and provided at an output terminal 518 as a high-definition image signal.

Although, in the fifth embodiment, the frequency of the pilot signal and that of the sampling clock are selected to be 195 fH and 6 fsc, respectively, they are not construed as limitative values. The M•M 520 need not necessarily be used as shown in FIG. 19, and a capacitor C and a resistor R may be inserted between the M•Ms 520 and 521, as shown in FIG. 21, to delay the rising timing of the signal outputted from the M•M 520 to thereby set the time T1.

As is apparent from the foregoing, in accordance with the fifth embodiment, it is possible to provide an image signal reproducing apparatus capable of reproducing a high-quality image signal with its residual jitter component reduced.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. An image signal recording and reproducing system arranged to record an image signal consisting of a luminance signal and a chrominance signal and including horizontal and vertical blanking portions on a recording medium and to reproduce a recorded image signal from said recording medium, comprising:

(A) luminance signal frequency-modulating means arranged to receive said luminance signal and to frequency-modulate the received luminance signal, thereby forming and outputting a frequency-modulated luminance signal;

(B) chrominance signal frequency-modulating means arranged to receive said chrominance signal and to frequency-modulate the received chrominance signal, thereby forming and outputting a frequency-modulated chrominance signal;

(C) pilot signal generating means for generating a pilot signal having a single frequency positioned in a frequency band where the frequency-modulated chrominance signal outputted from said chrominance signal frequency-modulating means is positioned and which is lower than a frequency band where the frequency-modulated luminance signal outputted from said luminance signal frequency-modulating means is positioned;

(D) pilot signal frequency-multiplexing means arranged to frequency-multiplex the frequency-modulated luminance signal outputted from said luminance signal frequency-modulating means with the frequency-modulated chrominance signal outputted from said chrominance signal frequency-modulating means, thereby forming a record image signal, and to frequency-multiplex the pilot signal generated by said pilot signal generating means with a portion of said record image signal, said portion of which corresponds to the vertical and horizontal blanking periods of the record image signal, except the image signal period of said record image signal and to output a frequency-multiplexed signal;

(E) recording means for recording the frequency-multiptexed signal outputted from said pilot signal frequency-multiplexing means on the recording medium;

(F) reproducing means for reproducing from said recording medium the frequency-multiplexed signal recorded on said recording medium by said recording means;

(G) extracting means for receiving the frequency-multiplexed signal outputted from said reproducing means and, when a signal is received from said reproducing means, said signal corresponding to a period which is a part of the vertical and horizontal blanking periods of the frequency-multiplexed signal, said blanking periods from which the periods of vertical and horizontal synchronizing signals are removed, thereby extracting the pilot signal frequency-multiplexed with said signal;

(H) sampling clock signal generating means for generating a sampling clock signal which is phase-synchronized with said pilot signal thus extracted by said extracting means; and (I) time base variation correcting means arranged to extract the record image signal from the frequency-modulated signal reproduced from said recording medium by said reproducing means and to apply a time base variation correction process to the extracted record image signal in accordance with the sampling clock signal generated by said sampling clock signal generating means.

2. A system according to claim 1, wherein said sampling clock signal generating means includes first filter means arranged to input the frequency-multiplexed signal reproduced from said recording medium by said reproducing means and to pass a signal in a frequency band equal to that of said pilot signal.

3. A system according to claim 2, wherein said time base variation correcting means includes:

(a) second filter means having a pass band different from that of said first filter means and arranged to input the frequency-multiplexed signal reproduced from said recording medium by said reproducing means and to pass a signal having a frequency band equal to that of said frequency-modulated image signal;

(b) luminance signal frequency-demodulating means for frequency-demodulating the signal which has passed through said second filter, thereby demodulating the luminance signal and outputting the demodulated luminance signal;

(c) third filter means having a pass band which is different from the pass bands of said first and second filter means and arranged to input the frequency-multiplexed signal reproduced from said recording medium by said reproducing and to pass signals in a frequency band equal to that of said frequency-modulated chrominance signal;

(d) chrominance signal-frequency-demodulating means arranged to frequency-demodulate the signal which has passed said third filter means, thereby demodulating and outputting the chrominance signal;

(e) color image signal forming means arranged to form a color image signal by using the luminance signal outputted from said luminance signal frequency-demodulating means and the chrominance signal outputted from said chrominance signal frequency-demodulating means, and to output the color image signal;

(f) digital color image signal forming means for forming and outputting a digital color image signal by digitizing the color image signal outputted from said color image signal forming means in synchronism with the sampling clock signal generated by said sampling clock signal generating means;

(g) reading out clock signal generating means for generating a precise read-out clock signal; and (h) temporary memory means for temporarily storing the digital color image signal outputted from said digital color image signal forming means in synchronism with the sampling clock signal generated by said sampling clock signal generating means and for outputting the stored digital clock image signal in synchronism with said precise read-out clock signal.

4. An image signal recording and reproducing system arranged to record an image signal including horizontal and vertical blanking portions on a recording medium and to reproduce a recorded image signal from said recording medium, comprising:

(A) frequency-modulating means arranged to receive said image signal and to frequency-modulate the received image signal, thereby forming and outputting a frequency-modulated image signal;

(B) pilot signal generating means for generating a pilot signal having a single frequency;

(C) pilot signal frequency-multiplexing means for frequency-multiplexing the pilot signal generated by said pilot signal generating means with a portion of the frequency-modulated image signal, said portion of which corresponds to the vertical and horizontal blanking periods of said image signal, except the image signal period of the frequency-modulated image signal outputted from said frequency-modulating means and outputting a frequency-multiplexed signal;

(D) recording means for recording the frequency-multiplexed signal outputted from said pilot signal frequency-multiplexing means on the recording medium;

(E) reproducing means for reproducing from said recording medium the frequency-multiplexed signal recorded on said recording medium by said recording means;

(F) sampling clock signal generating means for generating a sampling clock signal;

(G) extracting means for receiving the frequency-multiplexed signal outputted from said reproducing means and extracting the frequency-multiplexed pilot signal from among said received frequency-multiplexed signal during a period which is a part of the vertical and horizontal blanking periods of the frequency-multiplexed signal, said blanking periods from which the periods of vertical and horizontal synchronizing signals are removed;

(H) phase comparing means arranged to phase compare said pilot signal extracted by said extracting means with the sampling clock signal generated by said sampling clock signal generating means and to output a phase error signal in accordance with a result of said phase comparison; and (I) phase control means arranged to control the phase of the sampling clock signal generated by said sampling clock signal generating means in accordance with the phase error signal outputted from said phase comparing means during a period of time which corresponds to the vertical and horizontal blanking portions of the image signal except the image signal portion of the frequency-multiplexed signal.

5. A systems according to claim 4, wherein said image signal recording and reproducing system further comprises time base variation correcting means arranged to extract the frequency-modulated image signal from the frequency-multiplexed signal outputted from said reproducing means and to apply a time base variation correcting process to the extracted frequency-modulated image signal in accordance with said sampling clock signal generated by said sampling clock signal generating means and output the corrected signal.

6. A system according to claim 5, wherein said phase comparing means includes first filter means arranged to receive the frequency-multiplexed signal outputted from said reproducing means and to pass a signal in a frequency band of said pilot signal.

7. A system according to claim 6, wherein said time base variation correcting means includes:

(a) second filter means having a pass band different from that of said first filter means and arranged to receive the frequency-multiplexed signal outputted from said reproducing means and to pass a signal in a frequency band of said frequency-modulated image signal;

(b) frequency-demodulating means for frequency-demodulating the signal passed through said second filter means, thereby demodulating the image signal and outputting the demodulated image signal;

(c) digital image signal forming means arranged to digitize the image signal outputted from said frequency-demodulating means in synchronism with the sampling clock signal generated by said sampling clock signal generating means, thereby forming and outputting a digital image signal;

(d) read-out clock signal generating means for generating a precise reading out clock signal; and (e) temporary memory means arranged to temporarily store the digital image signal outputted from said digital image signal forming means in synchronism with the sampling clock signal generated by said sampling clock signal generating means and to output the stored digital image signal in synchronism with said precise reading out clock signal.

8. An image signal recording and reproducing system arranged to record an image signal including horizontal and vertical blanking portions on a recording medium and to reproduce a recorded image signal from said recording medium, comprising:

(A) frequency-modulating means arranged to receive said image signal and to frequency-modulate the received image signal, thereby forming and outputting a frequency-modulated image signal;

(B) pilot signal generating means for generating a pilot signal having a single frequency;

(C) pilot signal frequency-multiplexing means arranged to frequency-multiplex the pilot signal generated by said pilot signal generating means with a portion of the frequency-modulated image signal, said portion of which corresponds to the vertical and horizontal blanking periods of said image signal, except the image signal period of the frequency-modulated image signal outputted from said frequency-modulating means and outputting a frequency-multiplexed signal;

(D) recording means for recording the frequency-multiplexed signal outputted from said pilot signal frequency-multiplexing means on the recording medium;

(E) reproducing means for reproducing from said recording medium the frequency-multiplexed signal recorded on said recording medium by said recording means;

(F) extracting means for receiving the frequency-multiplexed signal outputted from said reproducing means and, when a signal is received from said reproducing means, said signal corresponding to a period which is a part of the vertical and horizontal blanking periods of the frequency-multiplexed signal, said blanking periods from which the periods of vertical and horizontal synchronizing signals are removed, thereby extracting the pilot signal frequency-multiplexed with said signal;

(G) sampling clock signal generating means for generating a sampling clock signal which is phase-synchonized with said pilot signal thus extracted by said extracting means; and (H) sampling means arranged to extract the frequency-modulated image signal from the frequency-multiplexed signal outputted from said reproducing means and to effect sampling of the extracted frequency-modulated image signal in synchronism with the sampling clock signal generated by said sampling clock signal generating means and to output the sampled signal.

9. A system according to claim 8, wherein said image signal recording and reproducing system further comprises time base variation correcting means arranged to extract the frequency-modulated image signal from the frequency-multiplexed signal outputted from said reproducing means and to apply a time base variation correcting process to the extracted frequency-modulated image signal in accordance with the sampling clock signal generated by said sampling clock signal generating means and output the corrected signal.

10. A system according to claim 9, wherein said sampling clock signal generating means includes first filter means arranged to receive the frequency-multiplexed signal outputted from said reproducing means and to pass signals in a frequency band of said pilot signal.

11. A system according to claim 10, wherein said time base variation correcting means includes:

(a) second filter means having a pass band different from that of said first filter means and arranged to receive the frequency-multiplexed signal outputted from said reproducing means and to pass a signal in a frequency band of said frequency-modulated image signal;

(b) frequency-demodulating means for frequency-demodulating the signal passed through said second filter means, thereby demodulating the image signal and outputting the demodulated image signal;

(c) digital image signal forming means arranged to digitize the image signal outputted from said frequency-demodulating means in synchronism with the sampling clock signal generated by said sampling clock signal generating means, thereby forming and outputting a digital image signal;

(d) read-out clock signal generating means for generating a precise reading out clock signal; and (e) temporary memory means arranged to temporarily store the digital image signal outputted from said digital image signal forming means in synchronism with the sampling clock signal generated by said sampling clock signal generating means and to output the stored digital image signal in synchronism with said precise reading out clock signal.

12. An image signal recording and reproducing system arranged to record an image signal including a synchronizing signal and having horizontal and vertical blanking portions on a recording medium and to reproduce a recorded image signal from said recording medium, comprising:

(A) frequency-modulating means arranged to receive said image signal and to frequency-modulate the received image signal, thereby forming and outputting a frequency-modulated image signal;

(B) pilot signal generating means for generating a pilot signal having a single frequency;

(C) pilot signal frequency-multiplexing means for frequency-multiplexing the pilot signal generated by said pilot signal generating means with a portion of the frequency-modulated image signal, said portion of which corresponds to the vertical and horizontal blanking periods of said image signal, except the image signal period of the frequency-modulated image signal outputted from said frequency-modulating means and outputting a frequency-multiplexed signal;

(D) recording means for recording the frequency-multiplexed signal outputted from said pilot signal frequency-multiplexing means on the recording medium;

(E) reproducing means for reproducing from said recording medium, the frequency-multiplexed signal recorded on said recording medium by said recording means;

(F) extracting means for receiving the frequency-multiplexed signal outputted from said reproducing means and, when a signal is received from said reproducing means, said signal corresponding to a period which is a part of the vertical and horizontal blanking periods of the frequency-multiplexed signal, said blanking periods from which the periods of vertical and horizontal synchronizing signals are removed, thereby extracting the pilot signal frequency-multiplexed with said signal;

(G) sampling clock signal generating means for generating a sampling clock signal which is phase-synchronized with said pilot signal thus extracted by said extracting means;

(H) memory means arranged to extract the frequency-modulated image signal from the frequency-multiplexed signal outputted from said reproducing means and to digitize the extracted frequency-modulated image signal in synchronism with the sampling clock signal generated by said sampling clock signal generating means, thereby forming and storing a digital image signal; and (I) memory control means arranged to extract said synchronizing signal from the frequency-multiplexed signal outputted from said reproducing means and to reset write-in address of the digital image signal in said memory means in accordance with the extracted synchronizing signal and the sampling clock signal generated by said sampling clock signal generating means.

13. A system according to claim 12, wherein said image recording and reproducing system further comprises read-out clock signal generating means for generating a precise read-out clock signal, and said memory control means is arranged to read out the digital image signal stored in said memory means in accordance with the read-out clock signal generated by said read-out clock signal generating means.

14. A system according to claim 13, wherein said image signal recording and reproducing system further comprises analog converting means for converting the digital image signal read out from said memory means into an analog signal in synchronism with the read-out clock signal generated by said read-out clock signal generating means.

\* \* \* \* \*

UNITED STATES PATENT AND TRADEMARK OFFICE
CERTIFICATE OF CORRECTION

PATENT NO. : 5,598,274
DATED : January 28, 1997
INVENTOR(S) : Tokihiko Ogura, et al.

It is certified that error appears in the above-identified patent and that said Letters Patent is hereby corrected as shown below:

On the cover page, item [54], line 2, after "SYSTEM" add --WITH TIME BASE CORRECTION--.

Col. 1, line 3, after SYSTEM" add --WITH TIME BASE CORRECTION--.

Col. 1, line 5, Change "08/050 757" to --08/050,757--.

Col. 2, line 42, Change "Generating" to --generating--.

Col. 19, line 53, Change "record" to --records--.

Signed and Sealed this

Twenty-fourth Day of November, 1998

Attest:

BRUCE LEHMAN

*Attesting Officer*  *Commissioner of Patents and Trademarks*